(12) United States Patent
Berger et al.

(10) Patent No.: US 7,114,126 B2
(45) Date of Patent: Sep. 26, 2006

(54) SYSTEM AND METHOD FOR REAL-TIME OBSERVATION ASSESSMENT

(75) Inventors: Lawrence J. Berger, New York, NY (US); Gregory M. Gunn, Brooklyn, NY (US); John D. Stewart, Brooklyn, NY (US); Kenneth M. Gunn, New York, NY (US); Elizabeth Lynn, Brooklyn, NY (US); Nicole M. Adams, New York, NY (US); Anouk Markovits, New York, NY (US); Aaron Boyd, New York, NY (US)

(73) Assignee: Wireless Generation, Inc., New York, NY (US)

( * ) Notice: Subject to any disclaimer, the term of this patent is extended or adjusted under 35 U.S.C. 154(b) by 500 days.

(21) Appl. No.: 10/197,482

(22) Filed: Jul. 18, 2002

(65) Prior Publication Data

US 2003/0087219 A1    May 8, 2003

Related U.S. Application Data

(60) Provisional application No. 60/305,887, filed on Jul. 18, 2001.

(51) Int. Cl.
G06F 3/00       (2006.01)
G06F 3/48       (2006.01)
(52) U.S. Cl. .................. 715/750; 715/541; 434/167
(58) Field of Classification Search ............... 434/178, 434/362; 707/10; 715/512, 750
See application file for complete search history.

(56) References Cited

U.S. PATENT DOCUMENTS

| | | | | |
|---|---|---|---|---|
| 5,344,326 A | * | 9/1994 | Ferris | 434/336 |
| 5,594,640 A | * | 1/1997 | Capps et al. | 715/532 |
| 5,658,161 A | * | 8/1997 | Roberts et al. | 434/353 |
| 5,663,748 A | * | 9/1997 | Huffman et al. | 345/173 |
| 5,692,906 A | * | 12/1997 | Corder | 434/156 |
| 5,727,950 A | * | 3/1998 | Cook et al. | 434/350 |
| 5,778,404 A | * | 7/1998 | Capps et al. | 715/531 |
| 5,788,508 A | * | 8/1998 | Lee et al. | 434/350 |
| 5,823,788 A | * | 10/1998 | Lemelson et al. | 434/350 |
| 5,864,869 A | * | 1/1999 | Doak et al. | 707/104.1 |
| 5,879,165 A | * | 3/1999 | Brunkow et al. | 434/322 |
| 5,947,747 A | * | 9/1999 | Walker et al. | 434/354 |
| 5,956,034 A | * | 9/1999 | Sachs et al. | 715/776 |

(Continued)

OTHER PUBLICATIONS

Sunburst Technology et al, "Learner Profile with Learner to Go", Jan. 18, 2001 http://web.archive.org/web/20010118211500/http://www.sunburst.com pp. 1-22.*

(Continued)

*Primary Examiner*—Weilun Lo
*Assistant Examiner*—Steven B. Theriault
(74) *Attorney, Agent, or Firm*—Fish & Richardson P.C.

(57) ABSTRACT

A system, method and computer program product for real-time observation assessment is provided. The invention, designed for educators, takes advantage of handheld computers, desktop/laptop computers and the increasing presence of Internet access in order to reduce the paperwork associated with conventional educational assessments. The invention includes an array of instructional assessment applications designed to run on handheld computers. The instructional assessment applications may be based on existing and widely-used paper methodologies. A common Web-based platform for assessment application distribution, selection, download, data management and reporting is also provided. Users can then periodically synchronize instructional data (assessments, diagnostic results, notes and/or schedules) to the Web site. At the Web site, browser-based reports and analysis can be viewed, administered and shared via electronic mail.

39 Claims, 24 Drawing Sheets

U.S. PATENT DOCUMENTS

| | | | | |
|---|---|---|---|---|
| 5,957,699 | A * | 9/1999 | Peterson et al. | 434/350 |
| 5,980,263 | A * | 11/1999 | Conover | 434/322 |
| 5,991,594 | A * | 11/1999 | Froeber et al. | 434/317 |
| 6,088,730 | A * | 7/2000 | Kato et al. | 709/227 |
| 6,091,930 | A * | 7/2000 | Mortimer et al. | 434/362 |
| 6,164,974 | A * | 12/2000 | Carlile et al. | 434/322 |
| 6,178,308 | B1 * | 1/2001 | Bobrow et al. | 434/350 |
| 6,270,351 | B1 * | 8/2001 | Roper | 434/118 |
| 6,341,316 | B1 | 1/2002 | Kloba et al. | |
| 6,356,905 | B1 | 3/2002 | Gershman et al. | |
| 6,361,322 | B1 * | 3/2002 | Linden Henry | 434/178 |
| 6,405,167 | B1 * | 6/2002 | Cogliano | 704/251 |
| 6,505,031 | B1 * | 1/2003 | Slider et al. | 434/350 |
| 6,527,641 | B1 * | 3/2003 | Sinclair et al. | 463/39 |
| 6,592,379 | B1 * | 7/2003 | Stuppy | 434/322 |
| 6,628,918 | B1 * | 9/2003 | Roschelle et al. | 434/350 |
| 6,643,652 | B1 * | 11/2003 | Helgeson et al. | 707/10 |
| 6,676,412 | B1 * | 1/2004 | Masterson et al. | 434/169 |
| 6,681,098 | B1 * | 1/2004 | Pfenninger et al. | 434/362 |
| 6,705,872 | B1 * | 3/2004 | Pearson et al. | 434/322 |
| 6,729,885 | B1 * | 5/2004 | Stuppy et al. | 434/322 |
| 6,768,894 | B1 * | 7/2004 | Jongsma et al. | 434/353 |
| 6,885,844 | B1 * | 4/2005 | Roschelle et al. | 434/350 |
| 2001/0031457 | A1 * | 10/2001 | Pfenninger et al. | 434/350 |
| 2002/0032690 | A1 | 3/2002 | Liu et al. | |
| 2002/0087560 | A1 | 7/2002 | Bardwell | |
| 2003/0016873 | A1 * | 1/2003 | Nagel et al. | 382/228 |

OTHER PUBLICATIONS

GoKnow, LLC et al. "PAAM, Palm OS Artifact & Assessment Manager" Dec. 10, 2002 http://web.archive.org/web/20021210054553/http://www.goknow.com/paam.htm*

Phil Vahey et al, "Palm Education Pioneers Program: Final Evaluation Report" Feb. 2001- Aug. 2002. SRI International pp. 1-72.*

Penuel William, et al, "Designing handheld software to support classroom assessment: Analysis of conditions for teacher adoption" 2005 Journal of Technology, Learning and Assessment, 3(5) http://www.jtla.org pp. 1-46 See p. 6 for competing product info.*

Narita, Shigeru et al. "Development of Personal Communication agent for students with speech difficulties" 1997.*

Apple Museum; Apple Computer Co. et al "eMate 300" 1997.*

Annenberg Media et al: "Other Important Terms".*

Sunburst.com et al. "Middle School Assessment Indicators" 2001 http:/web.archive.org/web/20010715190726/www.sunburst.com/schoolhouse/learnerprofile/.* http://www.bankstreetcorner.com/voyages_of_mimi.shtml; Bank Street Corner: Science; The Voyages of the Mimi; pp. 1-2; (Nov. 5, 2005).

* cited by examiner

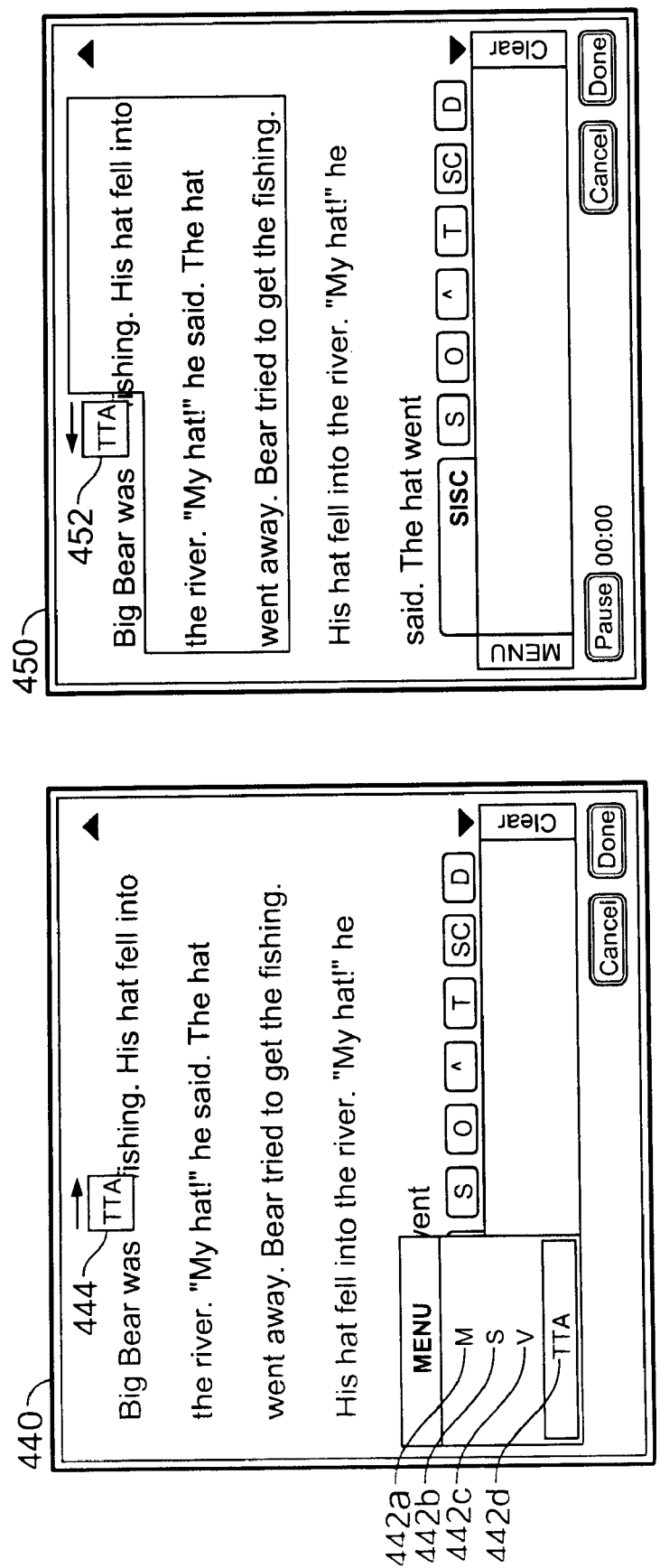

FIG. 5F

```
Wireless Generation: Manage Students - Microsoft Internet Explorer         _ □ ×
File  Edit  View  Favorites  Tools  Help
← Back ▼  → ▼  ⊗  ▣  ⌂  | ⊕ Search  ▦ Favorites  ⊕ Media  ⌘ | ▯▼ ⌸ ⊟ ≡ ⚿ ⚐
Address  🔗 http://www.txreading.com/i.php/student/StudentList                  ▯ ⟲ Go | Links »
```

Ken Gunn, Hope Elementary Fri 07/12/02 09:51am
Home | Log Out | Help

Home > Administration > Students

Manage Students

Add [ 1 ] student(s)

( Remove )    Total Students: 19    ( Add Student(s) )

| Remove? | Last Name (click to view/edit) | First Name | Student ID | Grade | Homeroom Teacher |
|---|---|---|---|---|---|
| ☐ | Bien | Liz | | K | Allen |
| ☐ | Burns | Amanda | | 2 | Bill Milan |
| ☐ | Gable | Ann | | 2 | Bill Milan |
| ☐ | Green | Bob | | 2 | Bill Milan |
| ☐ | Grushenko | Boris | | 1 | Keaton |
| ☐ | Hall | Annie | | 1 | Keaton |
| ☐ | Hernandez | Jorge | | 2 | Bill Milan |
| ☐ | Jackson | Melissa | | 2 | Bill Milan |
| ☐ | Krebs | Rainer | | 1 | Keaton |
| ☐ | Lacey | Helen | | K | Allen |
| ☐ | Lee | Matt | | 2 | Bill Milan |
| ☐ | Mellish | Fielding | | K | Allen |
| ☐ | Sato | Mike | | 2 | Bill Milan |
| ☐ | Schlosser | Luna | | 1 | Keaton |
| ☐ | Singer | Alvy | | 1 | Keaton |
| ☐ | Skakapopulis | Victor | | K | Allen |
| ☐ | Smith | Joe | | 2 | Bill Milan |
| ☐ | Starkwell | Virgil | | K | Allen |
| ☐ | Woods | Camille | | 2 | Bill Milan |

( Remove )                                             ( Add Student(s) )

Home > Administration > Students

Home | Log Out | Help

FIG. 5G

SYSTEM AND METHOD FOR REAL-TIME OBSERVATION ASSESSMENT

This application claims priority from U.S. Provisional Application Ser. No. 60/305,887, filed Jul. 18, 2001. The entirety of this provisional application is incorporated herein by reference.

BACKGROUND OF THE INVENTION

1. Field of the Invention

The present invention relates generally to computer information gathering and processing systems, and more particularly to a computer-based system and method for performing real-time educational assessments.

2. Related Art

In today's technological environment, many advances have been made in the fields of software and computing. More specifically, the advent of smaller, faster and more powerful laptops, mobile computing devices, personal digital assistants (PDAs) and the like, along with the increasing accessibility of the global, public Internet, have transformed how people work, play and learn. Likewise, new software applications for these advanced computing devices have been developed which allow people to become more efficient and productive in almost every aspect—whether it be in business or personal—of daily life. These advances have combined to make present society less of a paper culture and more of an electronic (digital) culture.

The above-mentioned advances, however, have not touched every aspect of present day life. That is, some tasks or processes are still done using "pen and paper." One example of this is the elementary school assessment process which is still primarily a paper process.

Classroom assessments are used by teachers as a powerful tool for improving student achievement. This is because classroom assessments can help teachers plan future lesson plans, adjust learning goals for particular students, and allows teachers to provide more frequent feedback to students about how to improve and actively engages students in their own learning. Using assessments allows teachers to adjust their lesson plans accordingly, thus resulting in higher student achievement. The administration and reporting of these assessments are often mandated by individual schools, school districts or state-wide departments of education.

The method by which teachers observe and assess student's skills and progress in a particular subject has not changed much over the past few decades and thus, has not benefitted from the above-described advances in the fields of software and computing. For example, in the area of reading and literacy, teachers often administer (paper) assessments to observe and assess student's reading skills and measure progress. One such assessment is known as the "running record" as described in Marie M. Clay, "An Observation Survey: Of Early Literacy Achievement," ISBN: 0435087630 (Heinemann 1993) [hereinafter "Clay"], which is hereby incorporated by reference in its entirety. The running record, as described in Clay, utilizes a system of coding, scoring, analysis and use of running record paper sheets and has been used in educational systems worldwide as a way of observing children's progress in the early years of learning about literacy and determining which children need supplementary teaching.

For all its benefits, the paper running records add to the already significant amount of paperwork which teachers must perform. That is, teachers, for each student, must prepare the records before administering the assessments and record scores and comments during the assessment, and keep the records for later analysis and generating reports. This is in addition to other paper work—such as progress reports, report cards, lesson plans and the like—which teachers must already perform. Thus, there has been a general need for tools to help teachers manage, minimize of ease the burden of paperwork and more specifically, the burden of paperwork with respect to (oftentimes, mandatory) educational assessments.

Therefore, given the above, what is needed is a system, method and computer program product for real-time observation assessment, designed for educators, that takes advantage of handheld computers, desktop/laptop computers and the increasing presence of Internet access in order to reduce the paperwork associated with conventional educational assessments.

SUMMARY OF THE INVENTION

The present invention meets the above-identified needs by providing a system, method and computer program product for real-time observation assessment.

The system of the present invention consists of an array of instructional applications designed to run on handheld computers, portable computing devices, personal digital assistants (PDAs) and the like. The instructional applications are all linked to a common Web-based infrastructure for application distribution, selection, download, data management and reporting.

The method and computer program product of the present invention allows users (e.g., teachers, educators and administrators) to visit a central Web site, where they can register individually or as part of a school or school district. Once registered, they can choose an application appropriate for their subject and grade level from numerous available applications. They then download (and in some cases, customize) these applications and install them on their handheld device for daily use.

Periodically (e.g., either daily or weekly), users synchronize instructional data (assessments, diagnostic results, notes and/or schedules) to the central Web site. At the Web site, browser-based reports and analysis can be viewed, student lists can be administered or further customizations can be made to previously-downloaded applications.

When teachers are part of a school or school district license, data and reports may be shared with other teachers, tutors, administrators or parents from that particular school or school district, and other school-based features may be enjoyed.

An advantage of the present invention is that it allows for more standardized data capture. That is, teachers often vary in the ways they capture and report assessment data. The present invention, however, helps to ensure that different teachers are generating comparable data for more meaningful observational assessment data comparison and analysis.

Another advantage of the present invention is that it provides immediate analysis and calculation of key statistics and elimination of "after-the-fact" data entry. Because assessments are often administered under severe time constraints, teachers often postpone the important numerical analysis until much later. In some cases, teachers must enter their written data into a computer analysis system. Providing immediate analysis, however, can speed the teacher's ability to take follow-up actions with students.

Another advantage of the present invention is that it provides streamlined reporting of assessment results and student needs. Teachers have to generate reading progress reports for administrators and parents. The conventional process currently involves a great deal of searching files for relevant assessments, and then "cutting and pasting" them into readable reports or entering assessment results into a computer spreadsheet. The automated data collection and report generation of the present invention reduces this process to a few minutes, thereby reducing teachers' paperwork burden. Furthermore, the reduced administrative burden and speed of the present invention encourages teachers to administer more frequent assessments, thereby benefitting students.

Yet another advantage of the present invention is that it provides streamlined generation of class-wide progress reports. Teachers and administrators currently create class-wide progress reports to spot when a student or a class is falling behind. Automating these reports, using the present invention, now saves paperwork and can give teaching staff a continuous view of class progress.

Another advantage of the present invention is that it allows for the aggregation, analysis and reporting of data at the school level, district level or even higher levels. By collecting assessment data from many classrooms into a central repository (unlike classroom desktop-based software applications), these reports and analyses are easily generated without time-consuming and costly collection and collation of data.

Another advantage of the present invention is that it allows for discretion and non-intrusiveness. The handheld devices on which the assessments of the present invention execute can be used during the reading process without creating a physical barrier between teacher and student. The assessments are easy to use and allow the teacher to keep their attention on the student.

Further features and advantages of the invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIGS. 4A–M are exemplary PDA-based windows or screen shots generated by the graphical user interface of the present invention.

FIGS. 5A–K are exemplary Web-based windows or screen shots generated by the graphical user interface of the present invention.

DETAILED DESCRIPTION

I. Overview

The present invention provides a system, method and computer program product for real-time observation assessment.

In an embodiment of the present invention, a service provider organization provides and allows access, perhaps on a subscriber fee or pay-per-use basis, to a Web-based tool that allows real-time observation assessment. The system, method and computer program product take advantage of handheld computers, desktop/laptop computers and the increasing presence of Internet access in order to reduce the paperwork associated with conventional educational assessments. That is, the service provider would provide the hardware (e.g., servers) and software (e.g., database) infrastructure (i.e., a platform), educational assessment application software, customer support, and billing mechanism to allow its customer-subscribers (e.g., individual teachers, reading specialist, educators, principals or school administrators, or entire schools, school districts or state-wide departments of education and the like) to download applications, upload assessment data, perform data analysis and generate and send reports via electronic mail. The tool would be used by subscribers to obtain both real-time and historical information, characteristics, and trend analysis to make educational planning decisions.

In a preferred embodiment of the present invention, a service provider organization provides and allows access, on a subscriber fee basis, to a platform that allows real-time observation literacy assessment based on the running record methodology described in Clay. The platform makes use a personal digital assistant (PDA), a desktop with synchronization software and access to the global Internet, and the service provider organization's Web site to enable real-time literacy assessment at the point of instruction, with data capture and transfer to an Web-based data system.

The present invention is now described in more detail herein in terms of the above example. This is for convenience only and is not intended to limit the application of the present invention. In fact, after reading the following description, it will be apparent to one skilled in the relevant art(s) how to implement the following invention in alternative embodiments (e.g., real-time observation assessment for subjects other than reading, applications that implement assessment methodologies other than that described in Clay, or utilizing other mobile computing devices other than a PDA).

The terms "user," "subscriber," "customer," "teacher," "educator," "school," "school district," "state-wide department of education," and the plural form of these terms may be used interchangeably throughout herein to refer to those who would access, use, and/or benefit from the tool that the present invention provides for real-time, observation assessment.

II. System Architecture

Figure 1:
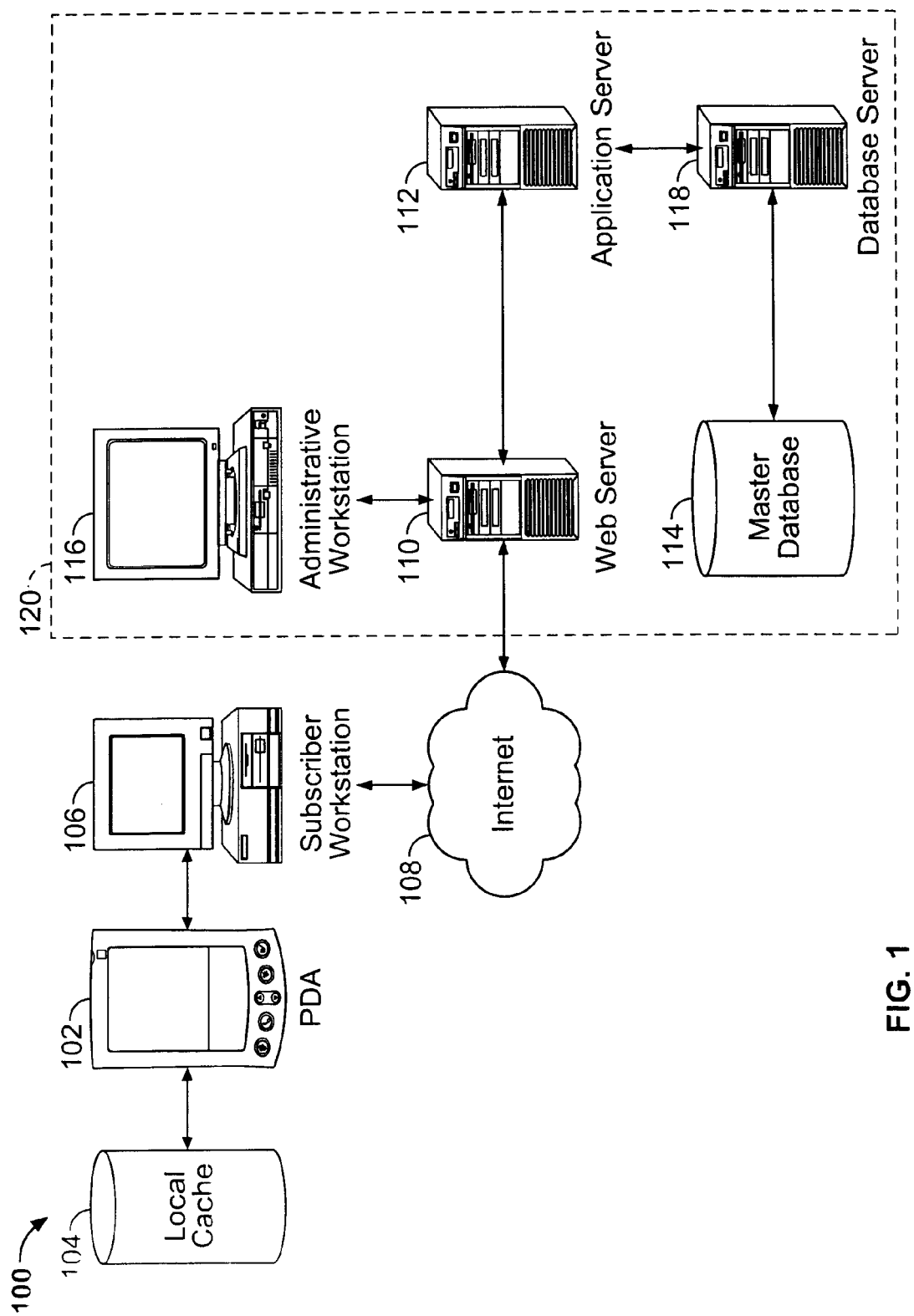
FIG. 1 is a block diagram illustrating the system architecture of an embodiment of the present invention, showing connectivity among the various components.

Referring to FIG. 1, a block diagram illustrating the physical architecture of a real-time observation assessment ("RTOA") system 100, according to an embodiment of the present invention, is shown. FIG. 1 shows network connectivity among the various components of system 100.

RTOA system 100 includes a plurality of subscribers (e.g., individual teachers, educators or school administrators, or entire schools, school districts or state-wide departments of education and the like). Each subscriber is equipped with a mobile computing device (e.g., a Palm™ V Handheld PDA) 102. Located within PDA 102 (but shown externally for ease of reference herein) is a local cache 104 which stores recently entered or accessed memory (e.g., a recently-entered or accessed student running record).

PDA 102 is linked, either via a serial or universal serial bus (USB) connection, to a workstation 106 (e.g., an IBM™ or compatible personal computer (PC) running the Microsoft® Windows 95/98™ or Windows NT™ operating system, Macintosh® computer running the Mac® OS operating system or the like), running a commercially-available Web browser (e.g., Microsoft® Internet Explorer). (For simplicity, FIG. 1 shows only one PDA 102 and workstation 106.) Subscribers would connect to the infrastructure of RTOA system 100 (i.e., a platform 120) which is provided and maintained by the RTOA service provider. Access to platform 120 is granted to subscribers via the global Internet 108.

In alternative embodiments, subscribers may access platform 120 of RTOA system 100 using any processing device including, but not limited to, a desktop computer, laptop, palmtop, workstation, set-top box, PDA with wireless Internet access and the like.

Platform 120 of RTOA system 100 includes a Web server 110, an application server 112, a master repository database 114 (located on a database server 118, but shown externally for ease of reference herein), and a plurality of administrative workstations 116 (shown as one workstation 116 in FIG. 1 for simplicity).

Web server 110 provides the "front end" for RTOA system 100. That is, server 110 contains a Web server process running at a Web site which sends out Web pages in response to Hypertext Transfer Protocol (HTTP) or Hypertext Transmission Protocol, Secured (HTTPS) requests from remote browsers (i.e., subscribers of the RTOA service provider). More specifically, it provides a graphical user interface (GUI) "front end" screens to subscribers of RTOA system 100 in the form of Web pages. These Web pages, when sent to the subscriber's workstation 106 (or the like), would result in GUI screens being displayed. In addition, server 110 provides the central point of communication that subscriber workstation 106 connects to for synchronization purposes.

In an embodiment of the present invention, server 110 is a Sun or NT workstation having access to application server 112. Application server 112 in turn has access to master repository database 114, via a database server 118, implemented with relational database management server software (e.g., Oracle 9 RDBMS). Database 114 is the central store for information within RTOA system 100 (e.g., book titles and text, subscriber information such as login names, passwords, etc., and student data such as running records, comments, historical data and demographics-related data for report generation).

While one database 114 is shown in FIG. 1 for ease of explanation, it will be apparent to one skilled in the relevant art(s), that RTOA system 100 may utilize databases physically located on one or more computers which maybe the same as any of servers 110, 112 or 118. Furthermore, in an embodiment of the present invention, database 114 can be mirrored for fault tolerance.

Application server 112 of platform 120 serves as the "back end" of the present invention. As such, it provides three main services (which are explained in more detail below with reference to FIG. 3). First, application server 112 contains logic for producing dynamic content for the Web interface of platform 120. Second, application server 112 provides a system-wide logging service that collects data for support and monitoring functions. Third, it contains logic for the remote management of software on subscriber desktops 106 and PDAs 102, as well as synchronization code logic that translates data first entered and stored in PDA 102 and uploaded from workstation 106 to Web server 110 for storage onto master database 114. In an embodiment of the present invention, server 112 is a Sun or NT workstation, although these services could be provided by (i.e., distributed among) a plurality of servers.

Administrative workstation 116 is used by the service provider organization as a management platform and contains a set of Web tools for remotely administering user, student, class and school data, as well as to update, maintain, monitor and log statistics related to server 110, server 112 and RTOA system 100 in general. Also, administrative workstation 116 may be used "off-line" by the service provider organization's personnel in order to enter configuration, user, student, school and application specific data in order to customize the performance of system 100. Accordingly, FIGS. 5D–F show exemplary windows or screen shots generated by Web server 110 that can be displayed on administrative workstation 116 in an embodiment of the present invention.

As will be apparent to one skilled in the relevant art(s) after reading the description herein, all of the components inside platform 120 are connected and communicate via a wide or local area network (WAN or LAN) which is placed behind a firewall for security purposes.

As will be appreciated by one skilled in the relevant art(s) after reading the description herein, a service provider organization can replicate platform 120 of RTOA system 100 in several market areas (i.e., schools or school districts) in which they offer services to support a plurality of subscribers (each having their own PDAs 102 and workstations 106).

More detailed descriptions of RTOA system 100 components, as well as their functionality, are provided below.

III. System Operation Overview

Figure 2:
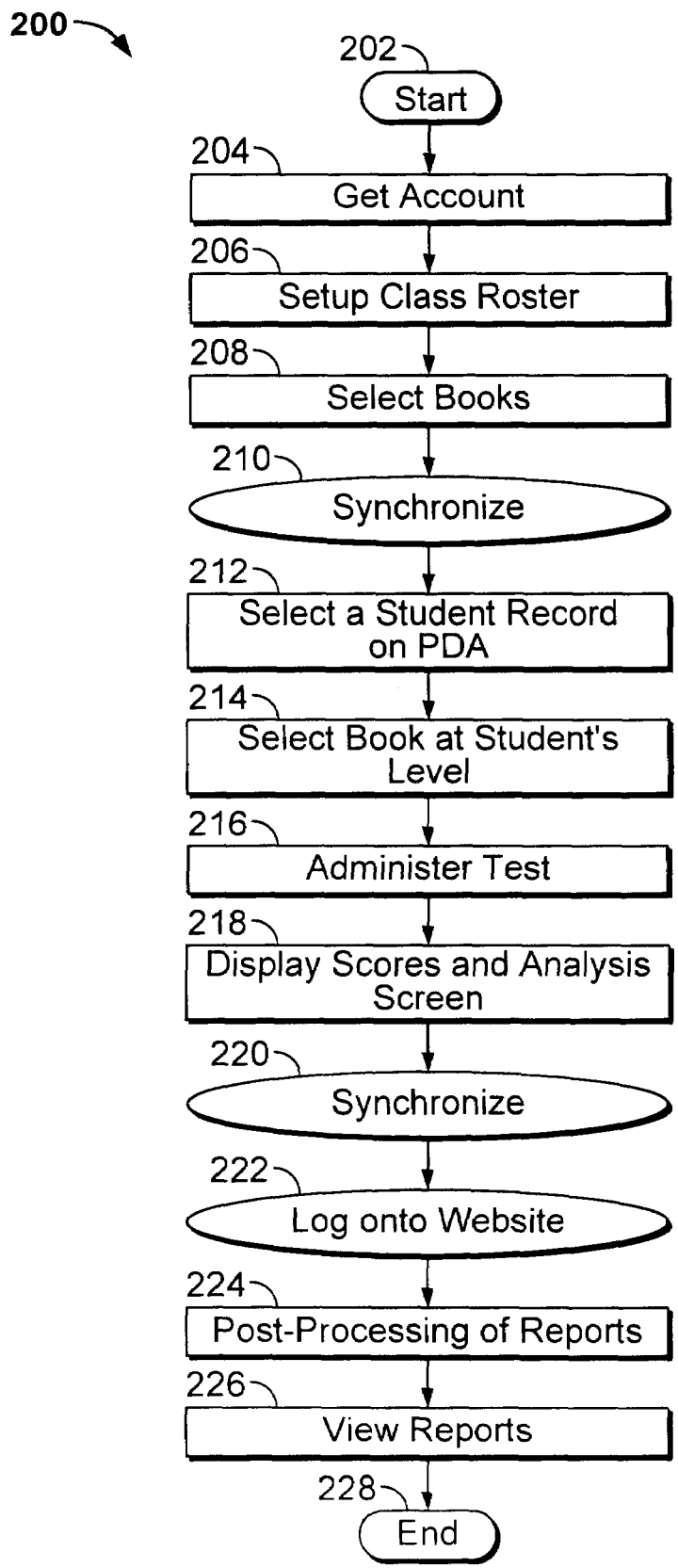
FIG. 2 is a flowchart depicting an embodiment of the operational process of the real-time observation assessment system of the present invention.

Referring to FIG. 2, a flowchart depicting an embodiment of an operational process 200 of the real-time observation assessment system 100 of the present invention is shown. That is, process 200 illustrates how, in an embodiment, an individual teacher (i.e., subscriber) may register with the service provider, download a running records literacy assessment application for their PDA (based on the methodology described in Clay), assess a student, upload the resulting data, and then generate a report. Flowchart 200 begins at step 202 with control passing immediately to step 204.

In step 204, a teacher would access the service provider's Web site using workstation 106 in order to obtain an account (i.e., a login and password). In an embodiment, the service provider organization may have a contractual arrangement with a school, school district or state-wide department of education which would allow individual teachers to obtain accounts and access platform 120 (and thus, the real-time observation assessment tool of the present invention).

In step 206, Web server 110 provides GUI screens to workstation 106 to enable the subscriber to set up a class roster (i.e., a list of student names, any other contact information and any demographics-related data kept by the subscriber for each student). FIGS. 5G–I show exemplary windows or screen shots generated by Web server 110 that can be displayed on subscriber workstation 106 during step 206 in an embodiment of the present invention.

In step 208, Web server 110 provides GUI screens to enable the subscriber to select and form a book list appropriate for the grade and reading levels for the subscriber's students.

In step 210, all licensed applications and supporting files, as well as data including the student roster and the entire text (or portion) of each book in the book list, are downloaded from platform 120 to the subscriber's PDA 102 via a synchronization process. (This would occur, in an embodiment, with PDA 102 in its cradle which is connected either via a serial or USB connection to workstation 106 and the user pressing the HotSync® button.) In an embodiment of the present invention, the synchronization process is accomplished via a plug-in to the HotSync synchronization software (i.e., a conduit) that accompanies such (e.g., Palm V Handheld) PDAs 102. In such an embodiment, the plug-in would be developed by the service provider organization using a software development kit (SDK) available from Palm, Inc. of Santa Clara, Calif.

As will be apparent to one skilled in the relevant art(s) after reading the description herein, the service provider organization would cause the plug-in to be downloaded to workstation 106 during the registration process (step 204). In an alternate embodiment, the plug-in could be loaded directly onto workstation 106 from a CD-ROM or other media made available to subscribers by the service provider prior to the registration process. As will be also apparent to one skilled in the relevant art(s) after reading the description herein, the service provider organization would make several different plug-ins available, using several different vendors' SDKs, based on the specific make and model of mobile computing device 102 being used by the subscriber.

In step 212, within the classroom environment and after the subscriber launches on their PDA 102 the previously-downloaded assessment application, an individual student's record is selected from the roster. This would be done as the subscriber is preparing to administer a real-time, observation assessment of the student's literacy.

In step 214, a book title is selected from the previously downloaded book list. In an embodiment of the present invention, books are organized according to grade and reading level so that the subscriber can identify and select appropriate books quickly. This causes the text of the selected book to be loaded in cache 104 of PDA 102.

In step 216, the previously-downloaded application is used to administer the real-time observation assessment of the student. (The real-time observation assessment process of step 216, in one embodiment, is explained in more detail below.)

In step 218, the student's scores and analysis from the assessment administered in step 216 is displayed on the screen of the PDA 102.

In step 220, the subscriber would return to workstation 106, place PDA 102 in its cradle, and the students running record, scores and any analysis would be uploaded to the Web site and stored onto database 114 via a synchronization process (similar to that described in step 210).

In an embodiment, the synchronization process of step 220 involves sending data stored in local cache 104 to Web server 110, via the Internet 108, in a compressed Extensible Markup Language (XML) format. Then, a synchronization service process executing on Web server 110 would translate the XML data into database records. Application server 112 then stores such records onto database 114.

In step 222, the subscriber would log onto the service provider's Web site (i.e., Web server 110) using workstation 106 and its connection to the Internet 108. The log in process, in an embodiment, would use the login name and password assigned during the registration process (i.e., step 204). FIGS. 5J–K show exemplary windows or screen shots generated by Web server 110 that can be displayed on subscriber workstation 106 during step 222 in an embodiment of the present invention.

In step 224, the subscriber would be presented with GUI screens by Web server 110 using data stored in database 114 to perform post-processing of the raw data uploaded during the synchronization process of step 220. That is, in an embodiment, application-specific reports and data editors are provided to users to allow a gallery of pre-configured reports to be generated on demand.

In step 226, the subscriber is allowed to view any of the generated reports on their workstation 106. In an embodiment, these reports may be forwarded and shared with administrators, parents, other teachers and the like, via electronic mail and the like.

The control flow of process 200 may then end as indicated by step 228.

It should be understood that process 200, which highlights the functionality and other advantages of RTOA system 100, is presented for example purposes only. The architecture of the present invention is sufficiently flexible and configurable such that users may utilize system 100 in ways other than that shown in FIG. 2. For example, as will be apparent to one skilled in the relevant art(s) after reading the description herein, workstation 106 may actually be a plurality of workstations where a school subscriber may designate certain workstations as "synchronization workstations" (i.e., for use during steps 210 and 220), while designating certain other workstations as "Web workstations" (i.e., for use during steps 204–208 and 222–226).

IV. Software Architecture

Figure 3:
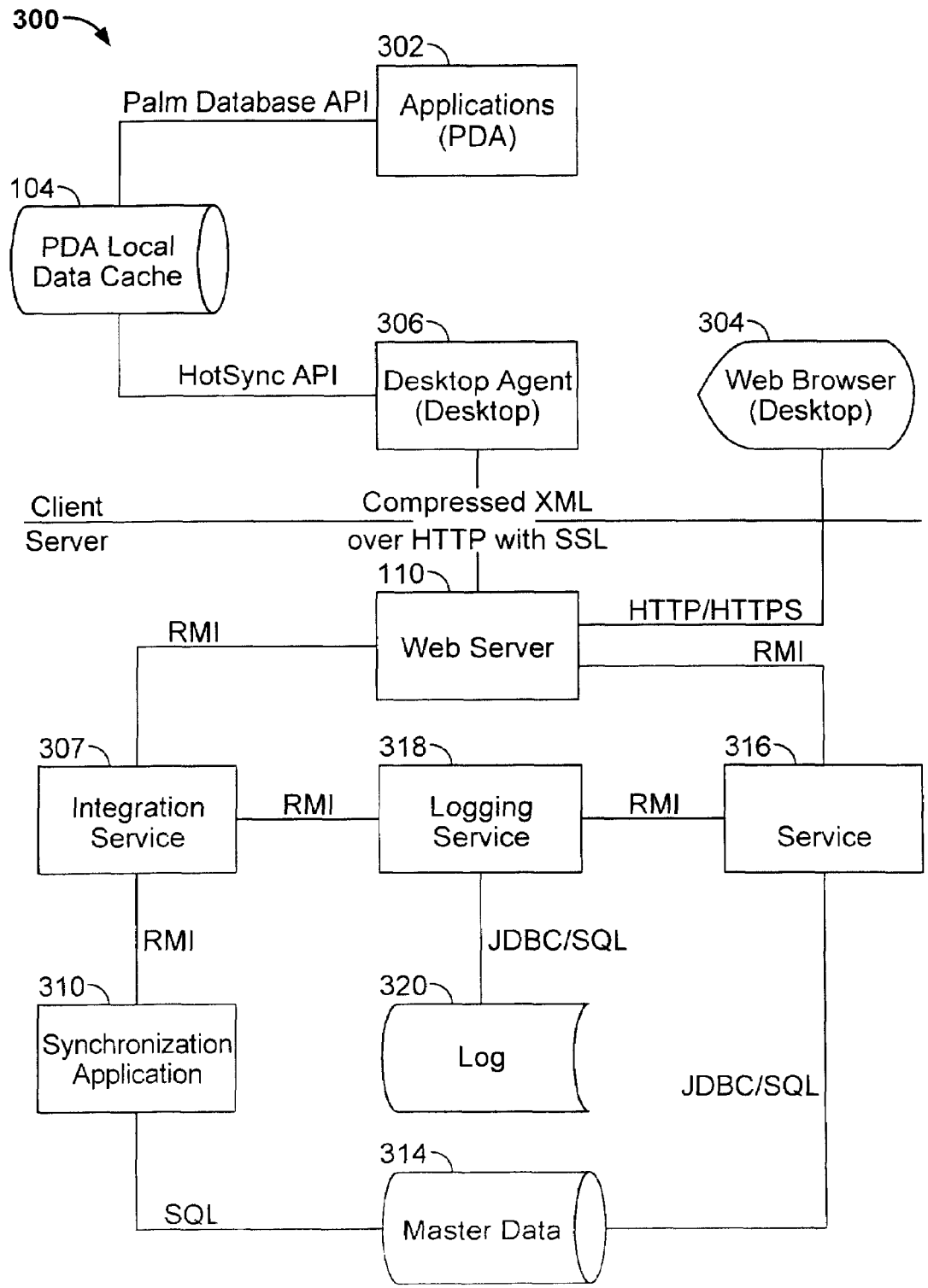
FIG. 3 is a block diagram illustrating the software architecture of an embodiment of the present invention, showing data flow among the various components.

Referring to FIG. 3, a block diagram illustrating a software architecture 300 of an embodiment of system 100 is shown. FIG. 3 also shows communications (i.e., the data flow) among the various components. In an embodiment of the present invention, architecture 300 is designed in the client-server paradigm where the client is the mobile computing device (i.e., handheld) 102 and workstation 106, and the server is distributed among the components of platform 120.

Architecture 300 includes a plurality of real-time observation assessment applications 302. An additional application on handheld device 102 maintains key parameters for synchronization. These include the user's login information, server addresses and state information regarding the most recent synchronization. In an embodiment of the present invention, all of these applications are written in a high-level programming language such as C++.

Applications 302 execute on handheld 102 and read and write data to and from the on-board data cache 104. Data cache 104 stores assessment information specific to each application as well as shared data (i.e., student and class data) used by all real-time observation assessment applications 302 offered by the provider organization.

A desktop agent 306 (residing on workstation 106) is a modular, scriptable extension (i.e., plug-in) to the desktop-based synchronization software that comes with the handheld 102. Desktop agent 306 handles network synchronization, error and event logging, PDA-based assessment application updates, system configuration and updates to agent 306 itself. In an embodiment of the present invention, desktop agent 306 is written in a high-level programming language such as C++ and an interpreted, interactive, object-oriented programming language such as Python.

Architecture 300 includes an integration service 307 and a Web interface service 316, both residing on application server 112. In an embodiment, these components are implemented using Java™ 2 Platform Enterprise Edition. Integration service 307 provides the scheduling of commands to be carried out by desktop agent 306 on a session-by-session basis. It routes communication from the client (i.e., subscriber workstation 106) to necessary component of platform 120. Web interface service 316 sends out Web pages, via Web server 110, in response to Hypertext Transfer Protocol (HTTP) or Hypertext Transmission Protocol, Secured (HTTPS) requests from remote Web browsers 306 executing on subscriber workstations 106. In step 226 of process 200, for example, the subscriber would be presented with GUI screens by Web server 110. This is accomplished by Web interface service 316 making Java Database Connectivity (JDBC)/SQL queries for master data 314 (e.g., assessment content and results) stored in database 114.

Architecture 300 includes a file and data synchronization application 310, residing on application server 112. Synchronization application 310 serves desktop agent 306 (i.e., a Sync Package 614 within agent 306 described in more detail below with reference to FIG. 6A). They communicate in SyncML—an XML-based open standard that specifies the protocol for synchronizing heterogeneous devices—in order to exchange and resolve file and data changes between master database 114 and the client's data store (i.e., cache 104). This interaction happens over a virtual communications channel carried over the HTTPS connection between agent 306 and integration service 307 (via a Sync Handler 305 within integration service 307 described in more detail below with reference to FIG. 6A). Synchronization application 310 is also responsible for storing all master data 314 (i.e., school, student and teacher information, assessment content and results) onto database 114 via SQL, handles permissions, and maintains data related to all synchronizations.

Architecture 300 includes a logging service 318 (residing on application server 112) and a log 320 (residing, in an embodiment, on database server 118) which are both explained in more detail below with reference to FIG. 6A.

In an embodiment of the present invention, components 307, 310 and 318, residing on application server 112, communicate via the Java programming language library's Remote Method Invocation (RMI).

V. Synchronization Process

Architecture 300 within system 100 allows real-time observation assessment application files, data and any updates to be installed transparently (i.e., without user intervention). The synchronization process (i.e., steps 210 and 220 of process 200), in an embodiment of the present invention, is now explained in more detail.

At first use, the user runs a one-time installation program, which registers the conduit (i.e., a shared library) with the synchronization manger software provided with their PDA 102 (e.g., the Palm's HotSync Manager). In addition, an application that manages synchronization information is installed to the PDA 102. The user then starts this application on PDA 102 and enters their valid user name and password.

When the user decides to synchronize, the user places PDA 102 in its cradle and presses the synchronization (e.g., HotSync) button. This action triggers the synchronization manger software of the PDA on workstation 106, which in turn calls the desktop agent 306. Agent 306 connects with Web server 110 (through a working connection to the Internet 108 from workstation 106) and automatically downloads and installs any new files required for any real-time observation assessment applications available from the service provider. Agent 306 also recognizes any new, changed and deleted data on PDA 102 and formats it for transmission to Web server 110.

In one embodiment, agent 306 communicates with Web server 110 using SyncML. SyncML messages are encrypted, compressed and exchanged using HTTP over secure sockets layer (SSL) (i.e., HTTPS), so firewalls and content-filtering agents will not block the communication channel.

Web server 110 forwards SyncML messages from agent 306 to synchronization application 310 running on application server 112. There, code logic reconciles the information received from agent 306 with the contents of the central database 114, resolves potential conflicts, and sends SyncML messages back to agent 306 specifying modifications to data store 104 on PDA 102 to ensure the data in data store 104 matches that in (i.e., is synchronized with) master data repository 114.

Application server 112 maintains a historical record of successful synchronization sessions for all users. In the case of inadvertent data corruption or loss of data on PDA 102, synchronization application 310 is able to restore the state of all real-time observation assessment applications on PDA 102 to an earlier, stable state.

As will be apparent to one skilled in the relevant art(s) after reading the description herein, the use of a wireless, Web-enabled PDA 102 would allow a user to bypass the use of workstation 106 in accessing platform 120.

The synchronization process within system 100, according to an embodiment of the present invention, is now described in more detail. This time, however, reference is made to software architecture 300 and the terminology defined in Table 1 below.

TABLE 1

| Term | Definition |
| --- | --- |
| Action | An operation that a properly equipped Agent 306 can execute. |
| Agent | A set of programs (i.e., remote management utility) residing on desktop 106. |
| Agent Core | The central part of Agent 306 that coordinates requests between Packages. |
| Command | An order for Agent 306 to invoke a specific Action, accompanied by arguments. |
| Context | A description of the circumstances under which Agent 306 is operating; key elements include Station identification and information pertaining to the particular Trigger that invoked the Agent. In the case of a device synchronization, this would include device identification as well as user authentication information. |
| Handler | An extension to the Integration Server that connects Desktop Agent 306 with another component of platform 120. |
| Package | An extension (i.e., shared library or script) that enables Agent 306 to perform one or more Actions. |
| Trigger | A program or other means that invokes Agent 306. |
| Schedule | A sequence of Commands to be sent to Agent 306. |
| Scheduling Rule | A mapping between a set of Contexts and a list of Commands. |

TABLE 1-continued

| Term | Definition |
|---|---|
| Session | A full operation of Agent 306, beginning with a Trigger and ending with either a hang-up Command from server 110 or an error. |
| Station | A desktop computer (i.e., workstation 106) that has Agent 306 installed. |

In general, the communication between desktop agent 306 and integration service 307 manifests itself as a series of message exchanges. Each exchange includes agent 306 assembling a message, making a connection to integration service 307, sending the message, receiving a response, and then breaking the connection. This "conversation" begins when agent 306 first contacts integration service 307. Desktop agent 306 continues to initiate exchanges with service 307 until service 307 explicitly indicates that the session has been completed with a hang-up command.

Figure 6A:
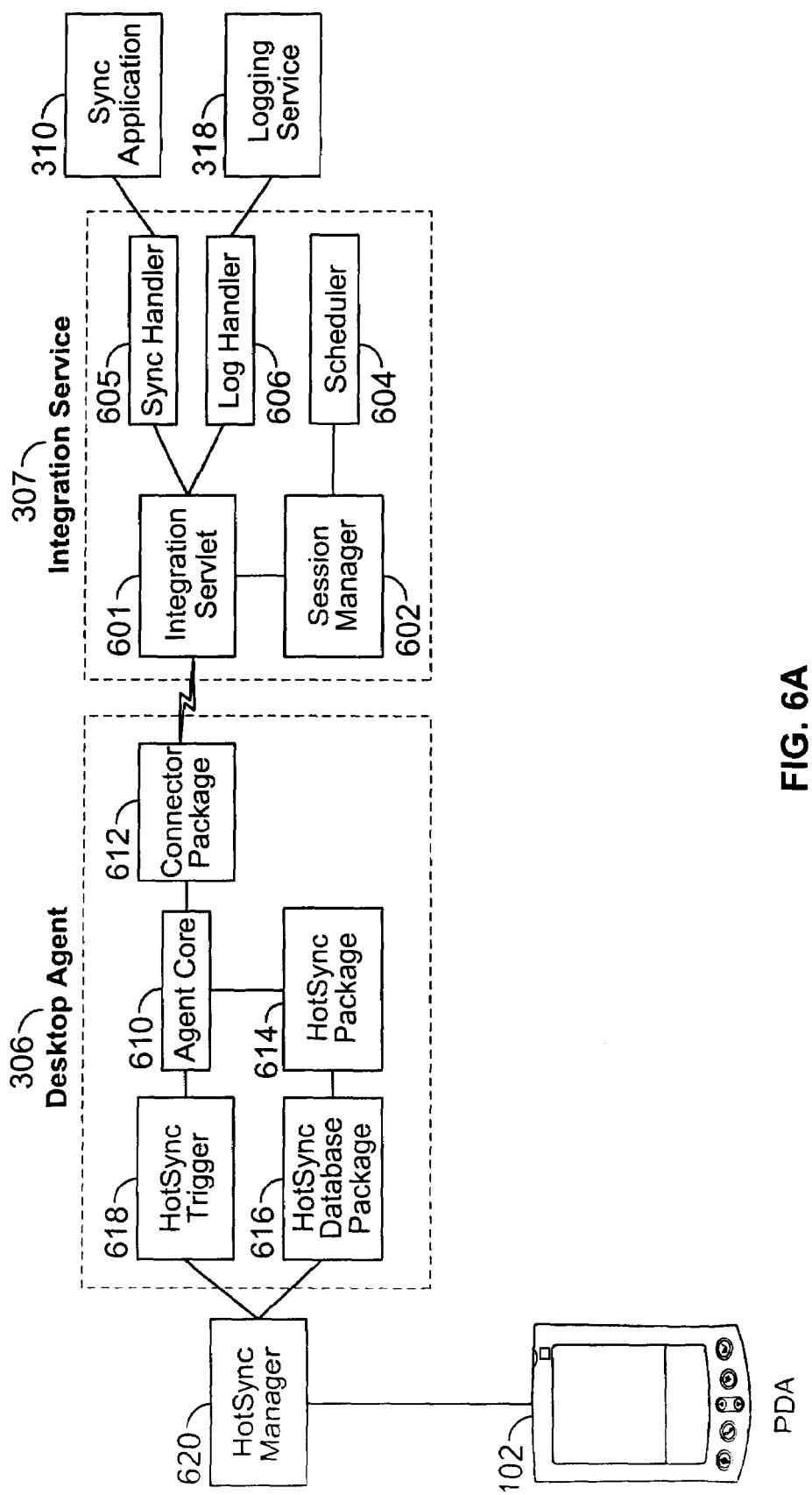
FIG. 6A is a block diagram illustrating in more detail, according to an embodiment of the present invention, portions of the software architecture shown in FIG. 3.

Shown in FIG. 6A is a block diagram illustrating in more detail, according to an embodiment of the present invention, portions of the software architecture originally shown in FIG. 3 is shown. The synchronization process (i.e., step 220 of process 200) is now described with reference to FIG. 6A in order to detail the interaction between desktop agent 306 and integration service 307.

When a user starts the HotSync process with handheld 102 (i.e., placing it in the cradle and pressing the HotSync button), a HotSync Manager 620 (residing on station 106) responds by starting a HotSync Trigger 618 for desktop agent 306, which in turn invokes an agent core 610.

Agent Core 610 connects to an integration servlet 601 (via a connector package 612 that initiates and manages communications between desktop agent 306 and Web server 110), and delivers a message identifying the station and an indication that the user has requested synchronization of handheld 102.

Integration servlet 601 contacts a session manager 602 which is responsible for maintaining session data across exchanges with agent 307. Session manager 602 then creates a session identifier, which is used to recall session state for later exchanges. Session manager 602 then contacts a scheduler 604, which returns a list of commands (i.e., a schedule) for agent 306 to execute. The schedule includes a command to begin a data synchronization, as well as commands to download any additional application files from server 110 that might be needed by station 106. Session manager 602 returns this session identifier and the schedule to integration servlet 601, which in turn packages them into a message which is sent to agent 306.

Agent core 610 then invokes a synchronization package 614, which initiates a synchronization process with synchronization application 310 (residing on application server 112). Synchronization package 614 initiates this process by assembling an initial message, including device identification as well as user name and password information from the handheld 102, which it obtains via a HotSync database package 616. HotSync database package 616 is a package that can read and/or write data to a data store on handheld 102 (e.g., cache 104).

This initial message is returned to agent core 610, which then sends the message to integration servlet 601. Servlet 601 recognizes that the message is to be handled by a synchronization handler 605, which performs any necessary translation before passing the message on to synchronization application 310. Application 310 responds with a series of messages for synchronization package 614, which are returned via synchronization handler 605 to servlet 601. This cycle continues until synchronization, application 310 indicates that it requires no further information. At this point, servlet 601 requests that agent 306 send any logging information it has gathered up to this point. This logging information (e.g., failure to contact the integration service 307 on a prior attempt, events leading up to a prior connection breakage, or failure to write a record to the PDA's data store 104 and the like) is sent to a log handler 606, which in turn interprets the information and passes it to logging service 318 (residing on application server 112) for storage into log 320 (residing, in an embodiment, on database server 118). Finally, servlet 601 instructs agent 306 to hang up, which ends the conversation.

Figure 6B:
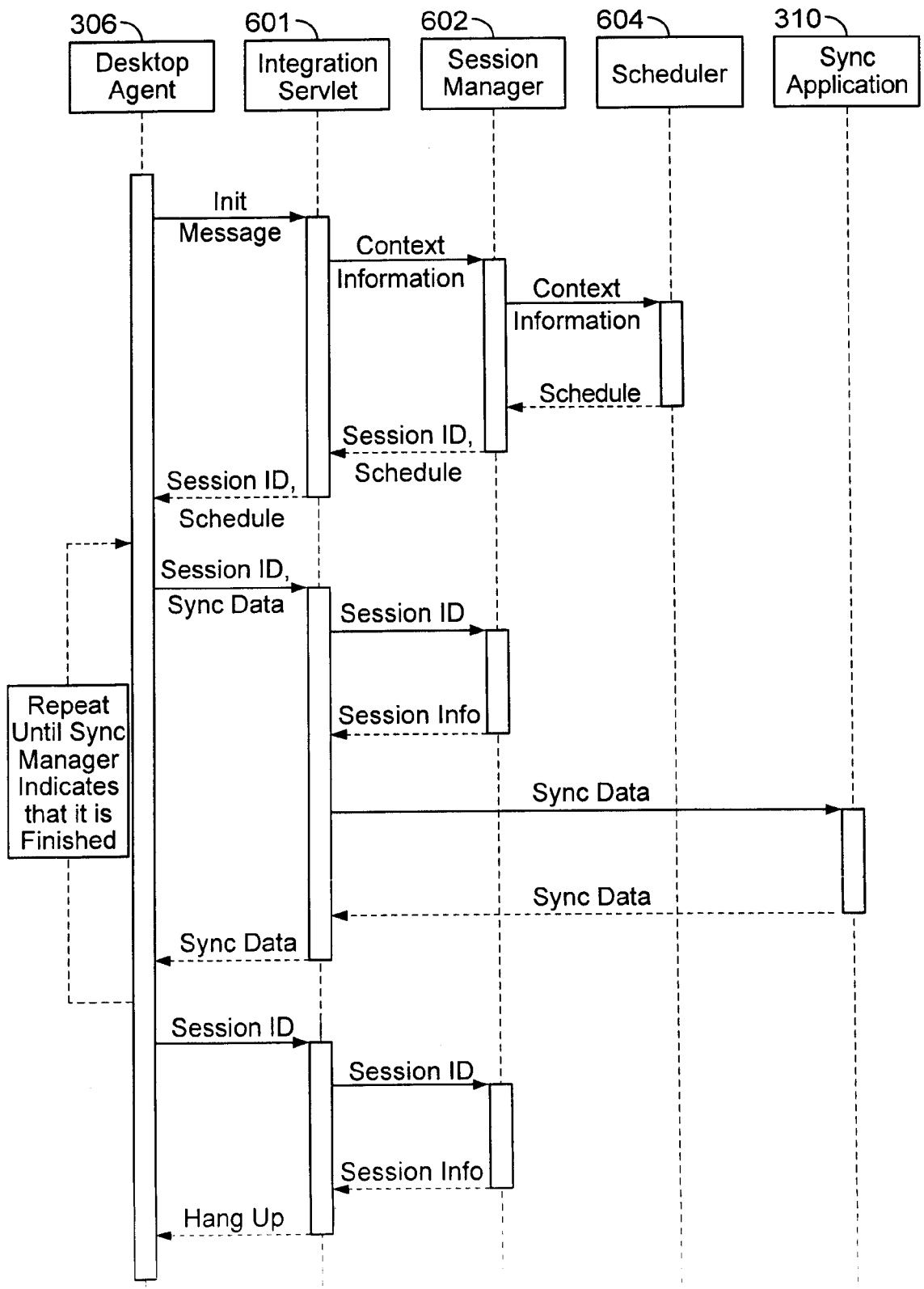
FIG. 6B is a sequence diagram illustrating the synchronization process in one embodiment of the present invention.

A sequence diagram illustrating the above-described synchronization process (i.e., step 220 of process 200), in one embodiment of the present invention, is shown in FIG. 6B.

VI. Real-Time Observation Assessment

As mentioned above, the present invention takes advantage of handheld computers, desktop/laptop computers and the increasing presence of Internet access in order to reduce the paperwork associated with conventional educational assessments. Thus, an embodiment of the present invention allows a service provider organization to provide a platform that allows real-time observation literacy assessment based on the running record methodology described in Clay. Such an embodiment is now described in more detail.

Referring to FIGS. 4A–H, exemplary windows or screen shots generated by a real-time observation literacy assessment application executing on PDA 102 during administration of an assessment are shown.

Figure 4B:
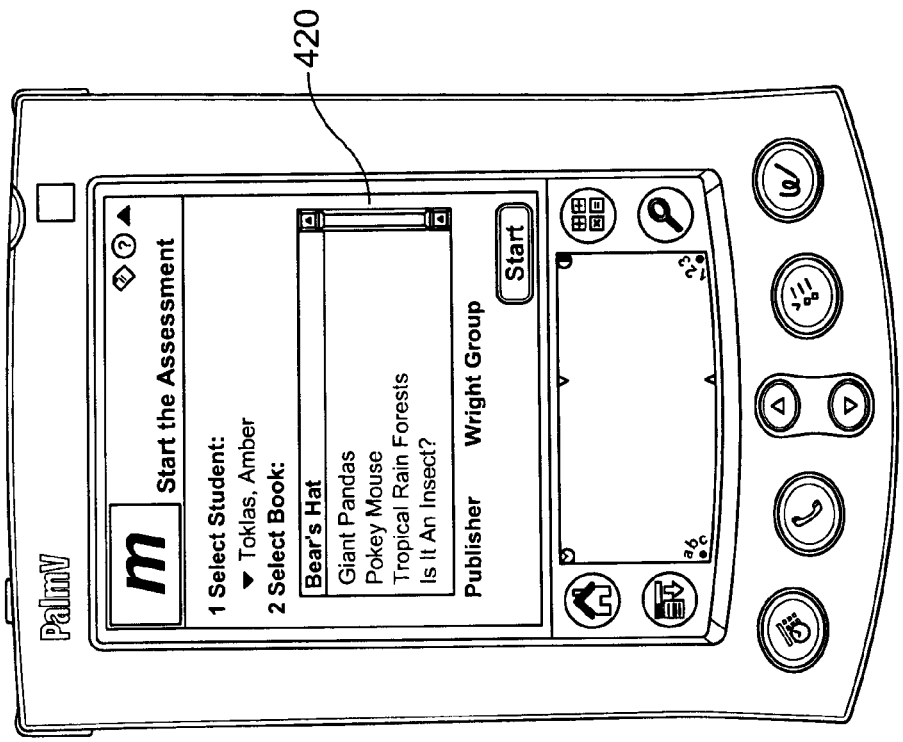
Figure 4A:
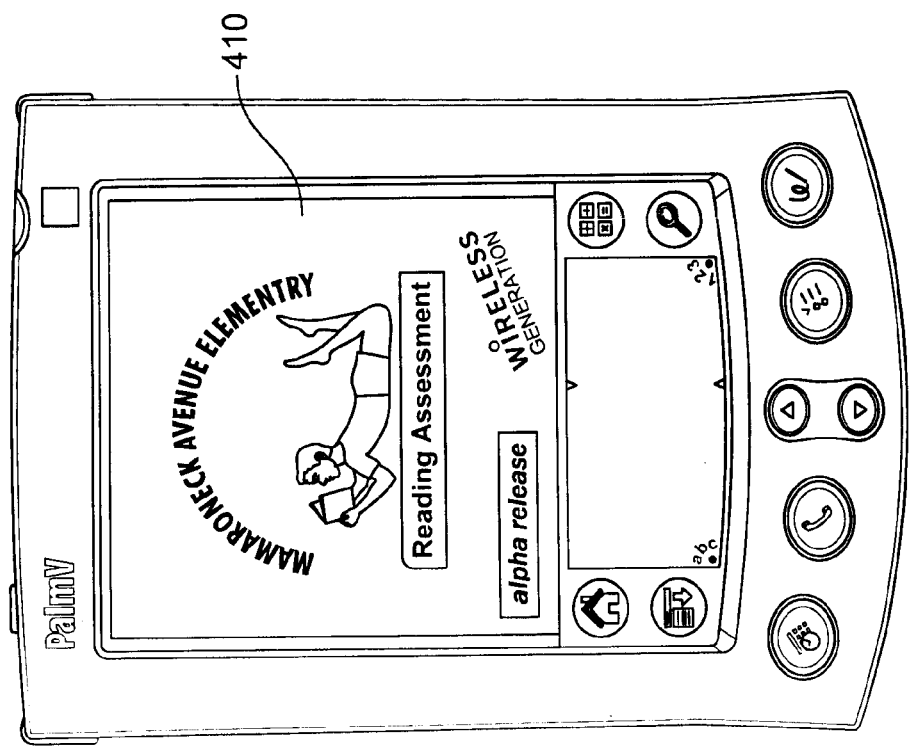

FIG. 4A is an exemplary "splash" window or screen shot 410, displayed on PDA 102 during the execution of the real-time observation literacy assessment application. That is, screen 410 is displayed on PDA 102 immediately after the assessment application is launched.

FIG. 4B is an exemplary window or screen shot 420 which would be displayed on PDA 102 during the student and book selection steps (i.e., steps 212–214 of process 200) of the real-time observation literacy assessment application. In an embodiment of the present invention, when the teacher selects a student from the class roster (top portion of screen 420), books that match that student's reading level automatically appear in the book selection list (lower portion of screen 420).

Figure 4C:
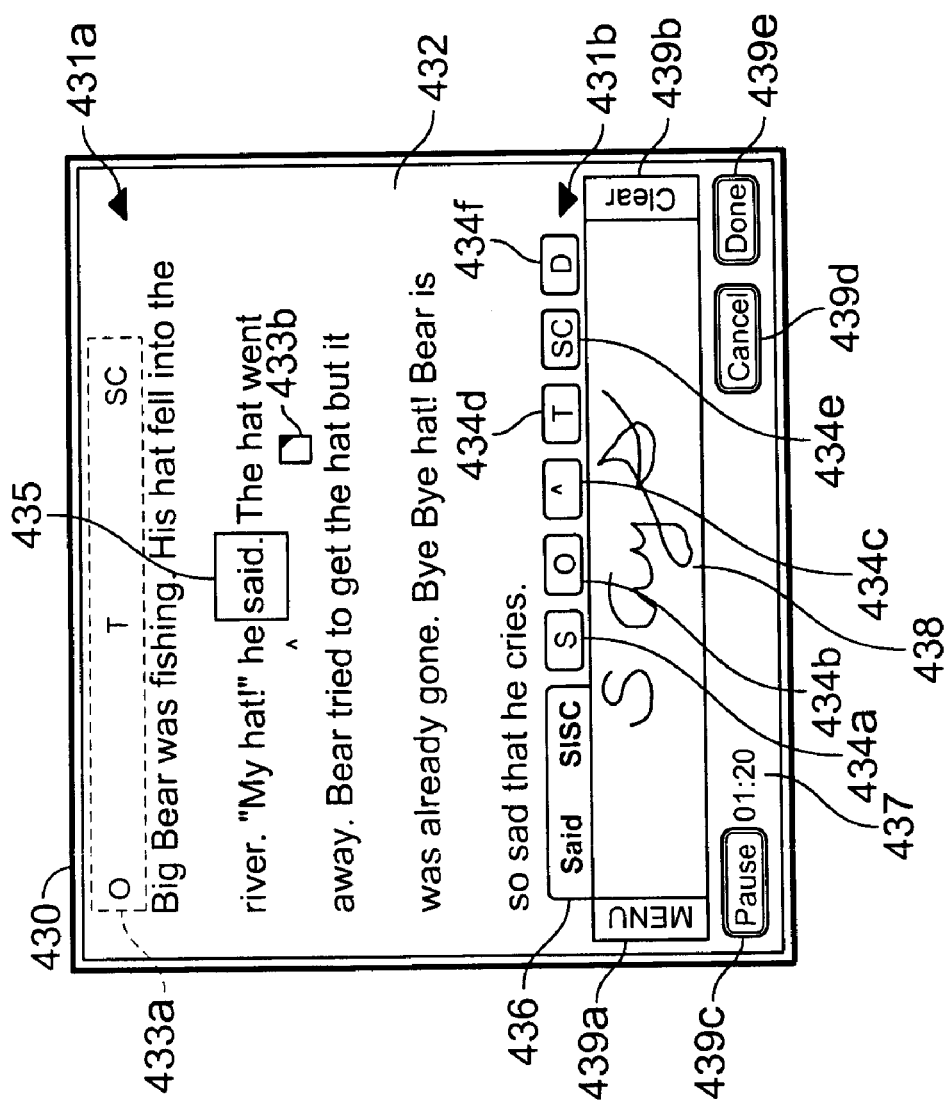

FIG. 4C is an exemplary window or screen shot 430 displayed on PDA 102 during the administration of the literacy assessment (i.e., step 216 of process 200) of the real-time observation literacy assessment application. Screen 430 includes a ticker area 432, a palette of code buttons 434a–f, a display ("lens") area 436, a freehand area 438 and a set of control buttons 439a–e.

The assessment would begin when the teacher taps on start/pause control button 439c. This causes a timer display 437 to begin timing the duration of the assessment. Ticker area 432 sequentially displays a pre-determined number of words from the text of the book selected in screen 420 (i.e., step 214 of process 200). As a student physically reads the book aloud, the teacher can follow along on PDA screen 430. As a student moves through the text of the selected book, (and thus, the pre-determined number of words displayed in ticker area 432), the teacher may use the PDA's stylus to tap an up arrow 431a or a down arrow 431b accordingly. At any time, the teacher may tap cancel control button 439*d* which would cancel the current assessment and not save any of its data onto the handheld 102.

In an embodiment of the present invention, as the student reads the book and the teacher follows along using ticker area 432, every time the student says a word correctly, the teacher needs to do nothing. Thus, in an embodiment, the real-time observation literacy assessment application is non-linear. That is, it saves effort and time for the teacher by emphasizing the capture of error-related (or behavior of interest-related) data during the assessment.

In such an embodiment, when a student says a word incorrectly (or exhibits some other behavior of interest), however, the teacher taps the word in area 432 which causes the word to be placed in a highlighted area 435 within ticker area 432. This also causes the selected word to be displayed in lens area 436. Freehand area 438 may then be used by the teacher to make a note about the error (e.g., writing the word the student mistakenly substituted for the highlighted word actually in the book's text). In an embodiment, these notes are taken in freehand thereby eliminating the need to use Graffiti. At any time during this process, clear control button 439*b* may be tapped to clear any freehand text placed in area 438 by the teacher in error.

Next, the teacher taps one or more of the code buttons 434 in the palette to identify the error(s) or behavior(s) of interest. In an embodiment of the present invention that implements the Clay methodology, as will be appreciated by one skilled in the relevant art(s), buttons 434 provided in the palette by the literacy assessment application are described in Table 2 below.

TABLE 2

| Button Label/Code | Behavior of Interest |
|---|---|
| S | Substitution: button 434a is tapped when student substitutes another word, which may be written in area 438 by the teacher, for the tapped word in area 432. |
| O | Omission: button 434b is tapped when student omits the tapped word in area 432. |
| ^ | Insertion: button 434c is tapped when student inserts a word not in the text before/after the word tapped in area 432. |
| T | Told: button 434d is tapped when student could not read the word tapped in area 432 and had to be told by teacher. |
| SC | Self-Correction: button 434e is tapped when the student said the word tapped in area 432 incorrectly, but then corrected themselves. |

In an embodiment of the present invention, as shown in screen 430, after the teacher taps on one of the buttons in palette 434, this would cause the button label to appear in lens area 436 and a unique annotation (e.g., an annotation equal to the button label) to appear above the relevant word in ticker area 432 to correspond to the each button in palette 434. A series of such annotations is shown in area 433*a*. (An "s" annotation also appears above the word "said" in highlighted area 435 indicating the student substituted another word—i.e., the word "says" which the teacher noted in area 438—for the word "said.") Further, in such an embodiment, other annotations can appear in ticker area 432. For example, a note icon annotation 433*b* appears above the word "get" which indicates that the teacher created a note concerning what they observed during the child's reading of that word. In another example, a familiar "accurate" checkmark would appear above each word the student read correctly.

In an embodiment, delete control button 434*f* acts as an "undo" button that negates the effect of the last button in palette 434 tapped by the teacher. This would also cause any resulting annotation in area 432 to be erased or replaced by a note icon annotation 433*b* depending on the state of area 438. That is, in an embodiment, if area 438 does not contain a note, button 434*f* will cause the previously-created annotation to be erased. If, however, area 438 does contain a note, button 434*f* will cause the previously-created annotation to be replaced by a note icon annotation 433*b*, thereby indicating the completion of the note creation for the previously-tapped word.

In an embodiment of the present invention that implements the Clay methodology, the reading running records include the M/S/V coding system that indicates what cues sent the student in the wrong direction when they made an error and what cues were used by the student when they corrected themselves. That is, as will be appreciated by those skilled in the relevant art(s): an "M" code indicates that the student took a cue from the meaning or context of the text (i.e., passage) they were reading in making the mistake or correcting themselves; an "S" code indicates that the student took a cue from the syntax of the text they were reading in making the mistake or correcting themselves; and a "V" code indicates that the student took a visual cue from the text they were reading in making the mistake or correcting themselves.

Accordingly, the teacher may tap menu control button 439*a* during the assessment in order to display a second palette of buttons corresponding to the M/S/V coding system. FIG. 4D is an exemplary window or screen shot 440 displayed on PDA 102 during the administration of the literacy assessment (i.e., step 216 of process 200) of the real-time observation literacy assessment application. Screen 440 shows the expansion of menu control button 439*a*. This causes a palette of control buttons 442*a*–*c* corresponding to the M/S/V codes, respectively. The teacher can then indicate the use of meaning, syntax, or visual cues by pressing the appropriate control button 442. These indications are captured in the running record, along with the error, for later review, display or modification.

In an embodiment, palette 442 would include a Try That Again ("TTA") button 442*d* that allows a teacher, when a student make too many errors (e.g., after being distracted), to instruct the student to start over. Tapping TTA button 442*d* places a TTA expand icon 444 in ticker area 432 before the word that was tapped by the teacher as the beginning word for the TTA text portion. The application then calculates the last word of the TTA passage to be the last word in ticker area 432 that has been previously-coded with a behavior of interest button 434*a*–*e* by the teacher. Then, all the error-related annotations and notes are cleared from area 432 for the TTA text portion. By tapping on TTA expand icon 444, it turns into a TTA contract icon 452 as shown in screen 450 of FIG. 4E. Then, the text that was selected to be tried again is grayed out and the previously-recorded errors are displayed above the text. Tapping on TTA contract icon 452 will cause the handheld to return to screen 440.

In an alternate embodiment, the set of buttons 434 would include a "Repetition" button that allows the teacher to cause an arrow to appear in ticker area 432 indicating the beginning and ending point where the student repeated themselves while reading the (or those) word(s) aloud. FIG. 4F is an exemplary window or screen shot 460 which would be displayed on PDA 102 during such a repetition operation. That is, screen 460 illustrates the teacher tapping on the center of a word (i.e., "the") and dragging to center of any previous word (i.e., "fishing") to select a block of text the student repeated. In an embodiment, when the stylus moves off the original word, a left facing elbow bracket 462 displays on upper right hand corner of word to denote the end of the selected area. As the stylus moves along the text, a path 464 is drawn up to a right facing elbow bracket 466 that snaps to the upper left hand corner of the word that denotes the beginning of the selected block. In an alternate embodiment, this action may cause TTA button 442*d* to automatically appear for selection. In yet another embodiment, a note can be created about the repetition (e.g., number of repetitions, etc.) in freehand area 438.

Figure 4G:
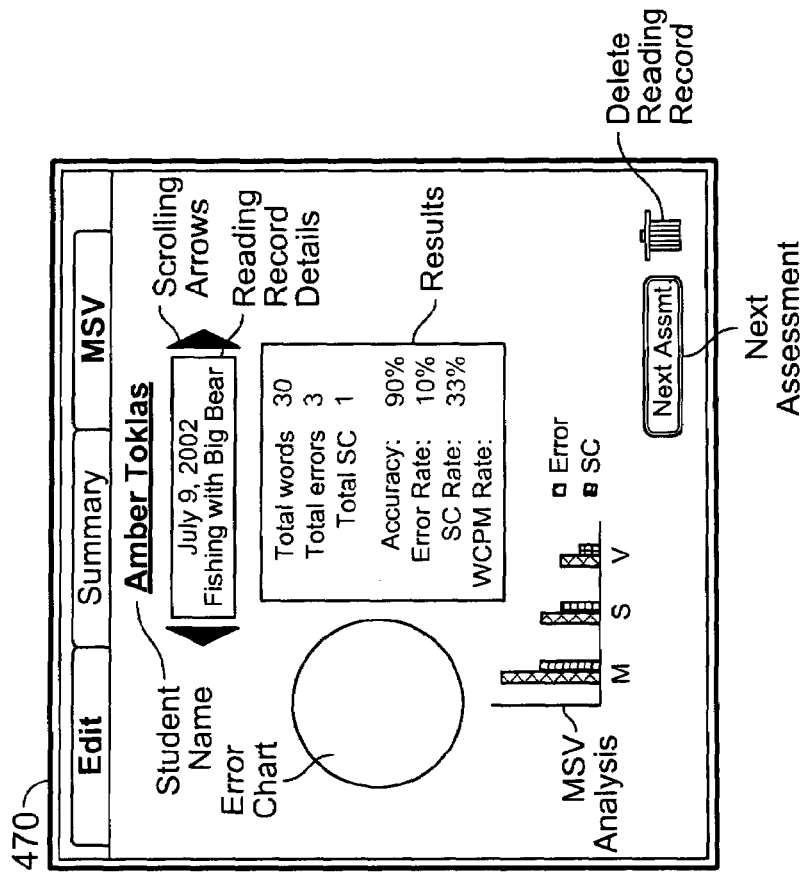
Figure 4F:
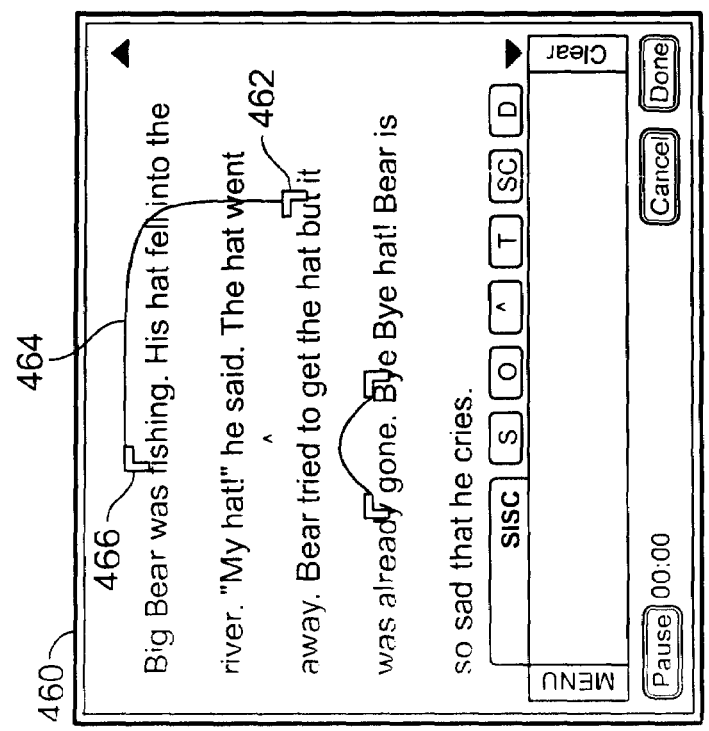
Figures 4H, 4I:
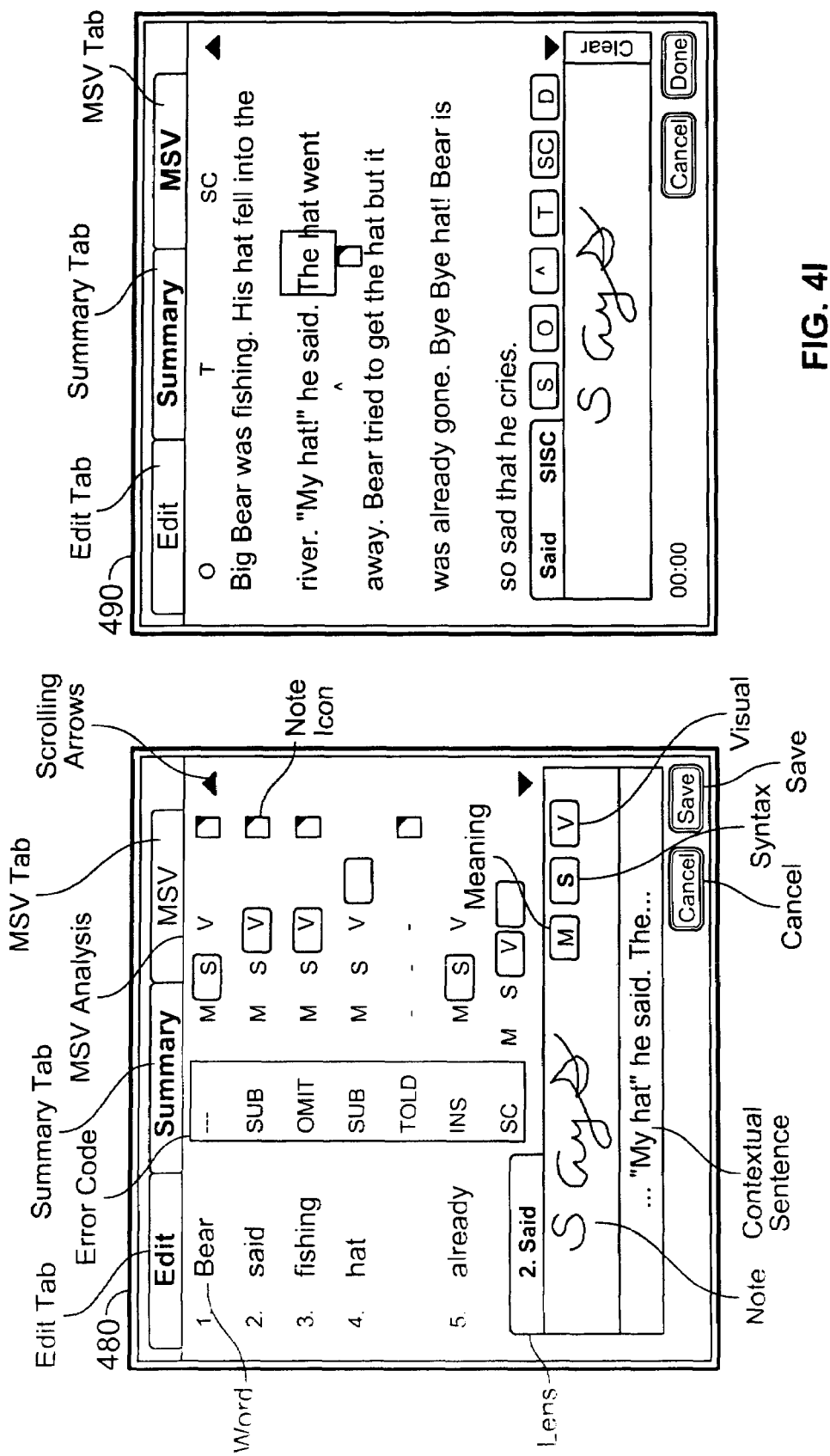

FIGS. 4G–4*i* are exemplary window or screen shots 470, 480 and 490, respectively, displayed on PDA 102 during the display scores and analysis step (i.e., step 218 of process 200) of the real-time observation literacy assessment application. That is, after the teacher taps the "Done" control button 439*e*, the assessment application is stopped and the assessment is complete.

Summary screen 470 may then be displayed, using the "Summary" tab shown, which gives the teacher instant information to support their teaching. As shown in screen 470, the real-time, observation assessment application immediately reports and charts the student's results (e.g., accuracy rate, total words, total errors, etc.), M/S/V analysis and other important statistics that were not previously available to teachers in prior paper-based assessments.

M/S/V analysis screen 480 may also be displayed, using the "MSV" tab shown, which gives the teacher additional instant information to support their teaching and provides an opportunity to record or modify M/S/V analyses. As shown in screen 480, the real-time, observation assessment application immediately reports more detailed M/S/V analysis than that previously-shown in screen 470. The teacher can select an error by clicking on the appropriate word, which causes lens area 436 to display the word, and any associated note and M/S/V analysis already recorded for that error to be displayed in freehand area 438. The teacher can then record or modify the M/S/V analysis for that error by pressing a set of M/S/V toggle buttons displayed in area 438.

Results edit screen 490 may also be displayed, accessible using the "Edit" tab shown, which gives the teacher the ability to edit and correct portions of the reading running record, including any notes in freehand area 438, before synchronization with Web server 110. In an embodiment of the present invention, such notes are stored in the handheld's local cache 104 using a platform-independent vector encoding. Upon synchronization, this encoded information is transmitted to Web server 110 and eventually stored in database 114. During report generation and viewing (i.e., steps 224–226 of process 200), the notes may be recreated by Web server 110 in Flash format for browser-based viewing on workstation 106.

Figure 4K:
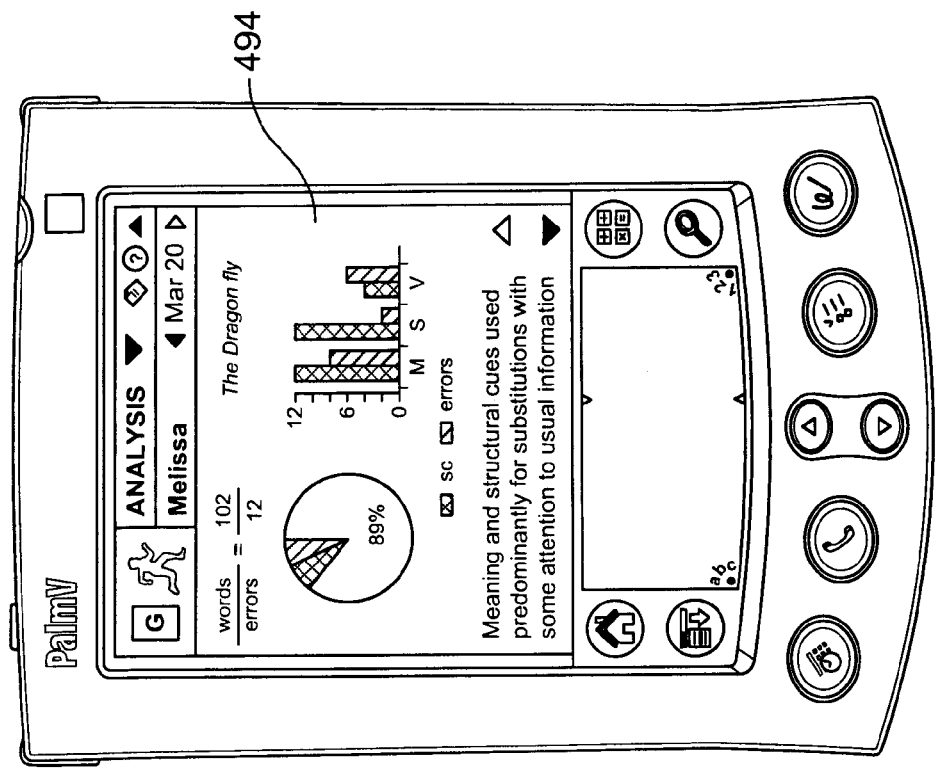
Figure 4J:
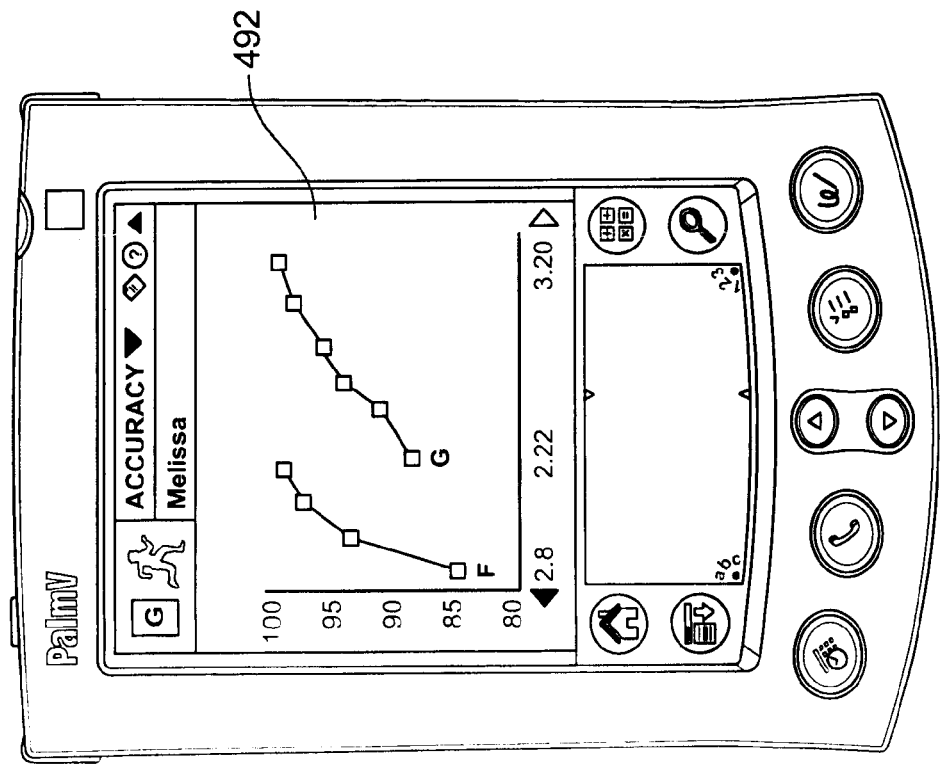

FIGS. 4J–4K are additional exemplary window or screen shots 492 and 494, respectively, displayed on PDA 102 during the display scores and analysis step (i.e., step 218 of process 200) of the real-time observation literacy assessment application. That is, after the teacher taps the "Done" control button 439*e*, the assessment application is stopped and the assessment is complete. Screen 492 may then be displayed which gives the teacher instant information to support their teaching. The application (i.e., screen 492) immediately reports the student's accuracy rate and other important statistics that were not previously available to teachers in prior, paper-based assessments.

In an embodiment, detailed results may be displayed graphically and are available to the teacher on screen 492. In the example of screen 492, a graph that displays the tested student's progress over time, including any change in reading level, is shown. Other view results screens, such as screen 494, take data that teachers previously had to interpret in purely numerical form, and make it easy to grasp visually. That is, the teacher can exactly determine how the tested student is progressing by using, for example, the ratio of accurately-read words to errors, self-corrections to errors and the like can be shown in pie chart form, and a graphical comparison of relative frequencies of meaning, syntax and visual miscues for errors and self-corrections can be displayed.

Figure 4M:
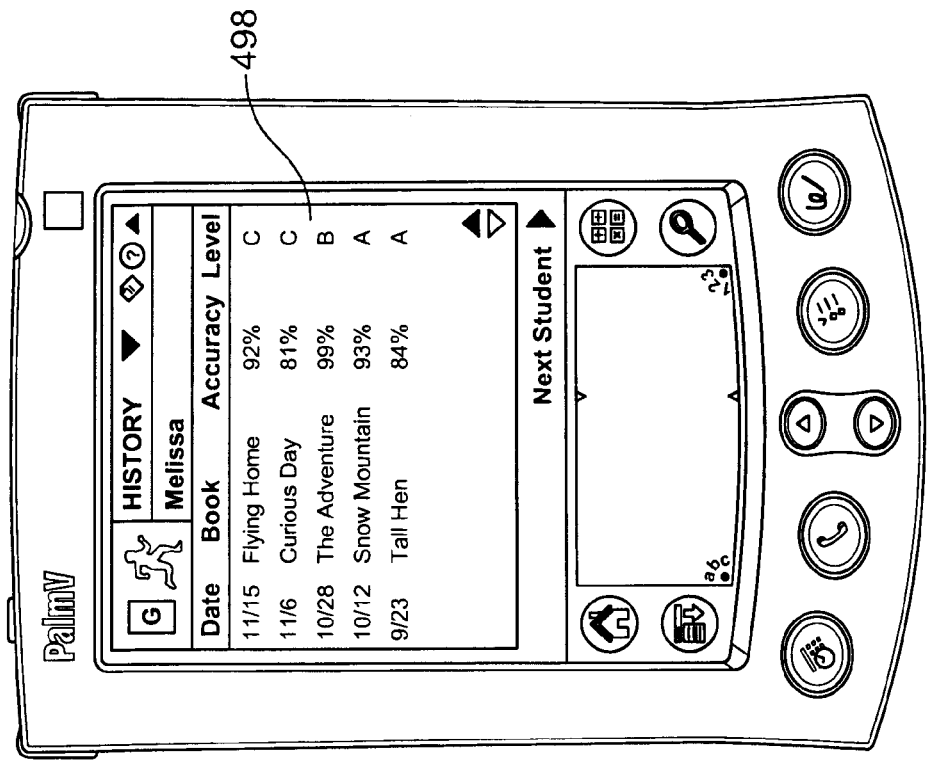
Figure 4L:
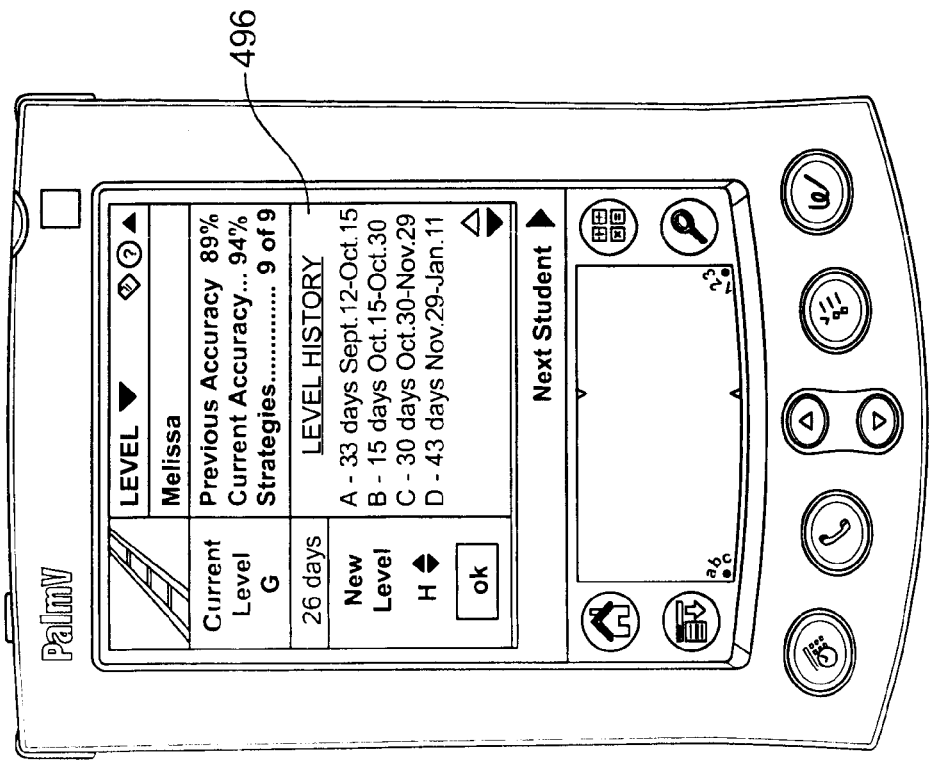

FIGS. 4L–4M are two additional exemplary window or screen shots 496 and 498, respectively, displayed on PDA 102 during the display scores and analysis step (i.e., step 218 of process 200) of the real-time observation literacy assessment application. The present invention also provides more "classroom management" tools, such as screen 496, that help teachers see the particulars of each student's reading progress, that help manage changes in reading level and the administration of reading groups. Many of these reports, such as screen 498, are useful for conferences among reading teachers and for conferences with parents in which a broad review of reading history is needed.

As mentioned above, the teacher can place their PDA 102 in its cradle, synchronize and then log onto the service provider's Web site via the Internet 108. Once there, several report window or screen shot can be displayed on workstation 106 during the view report step (i.e., step 126) of process 200). In general, these report screens allow the teacher to view a running record in the same manner as they would be on a paper record. However, more detailed analysis can be done, teachers can more easily type observations, and records can be shared in a discussion with colleagues or experts. Progress reports also can be generated by grade level, by school, and even by district.

Figure 5A:
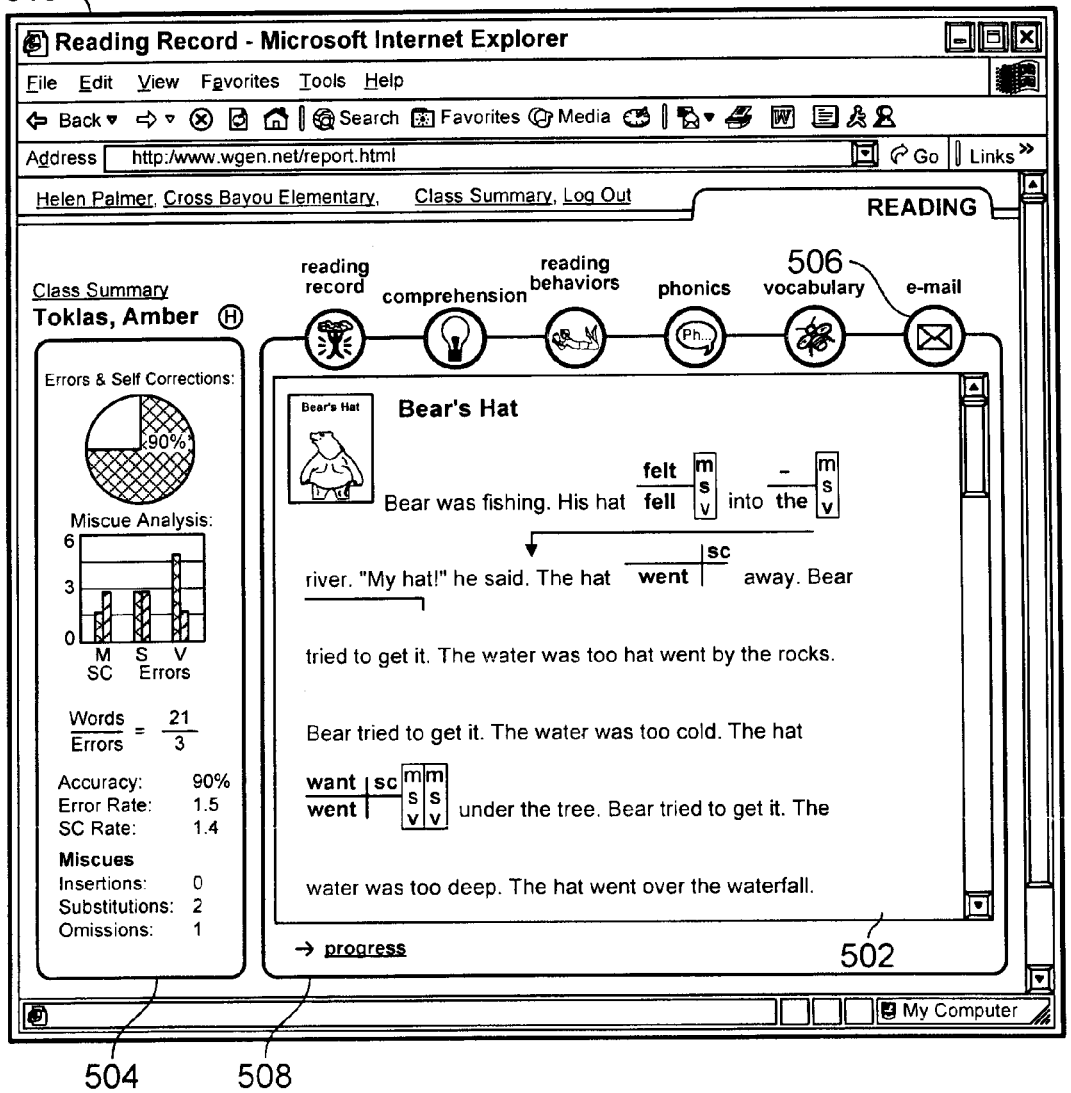
Figure 5B:
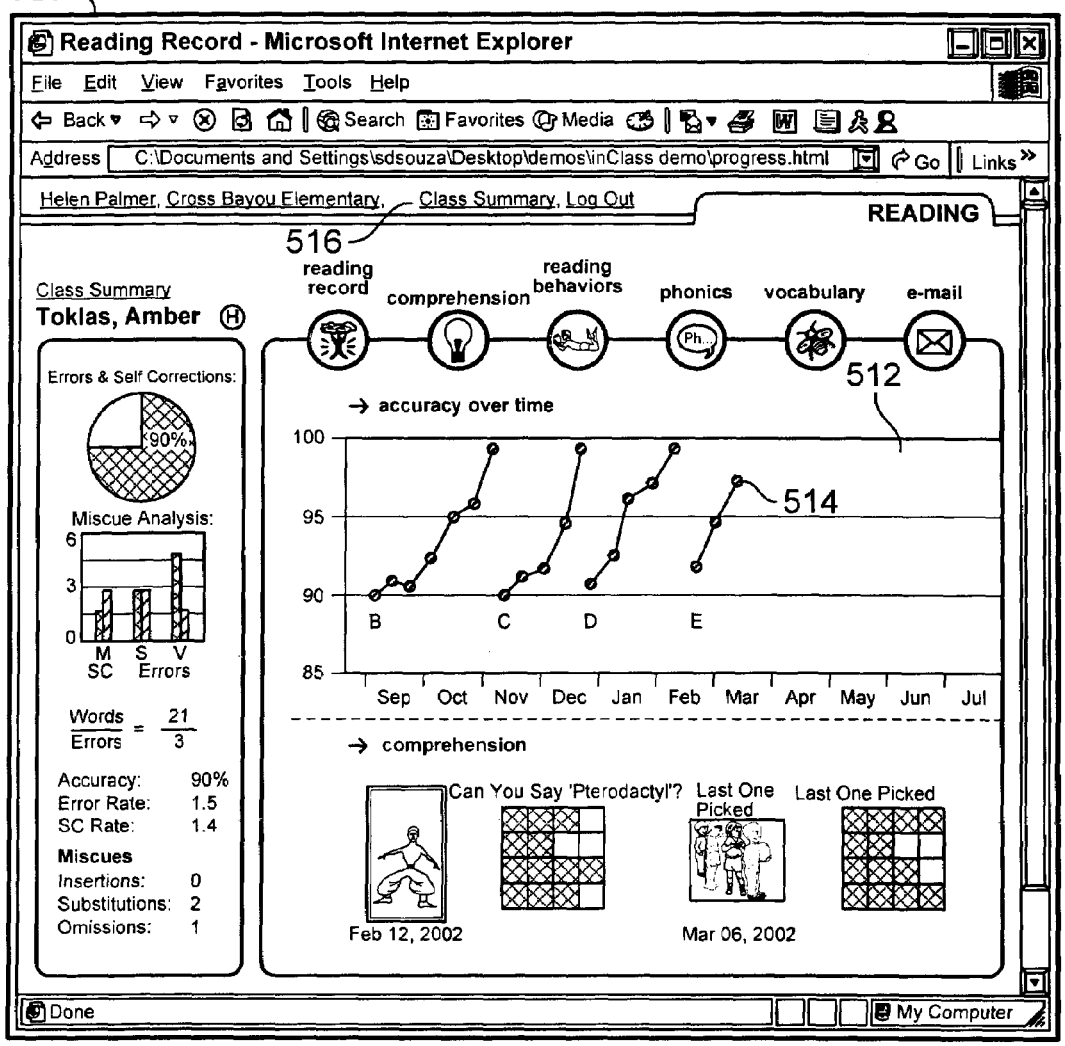
Figure 5C:
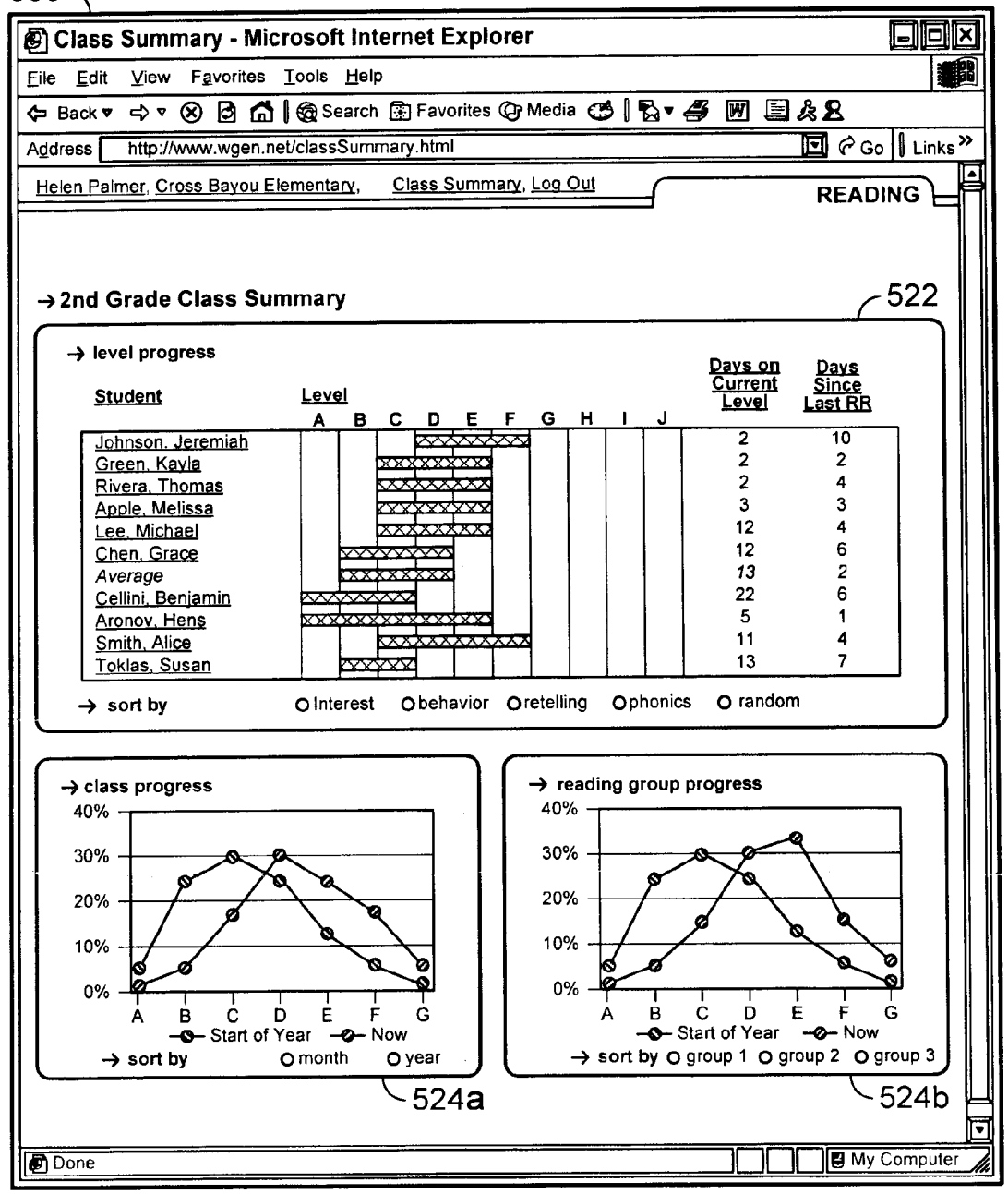
Figure 5D:
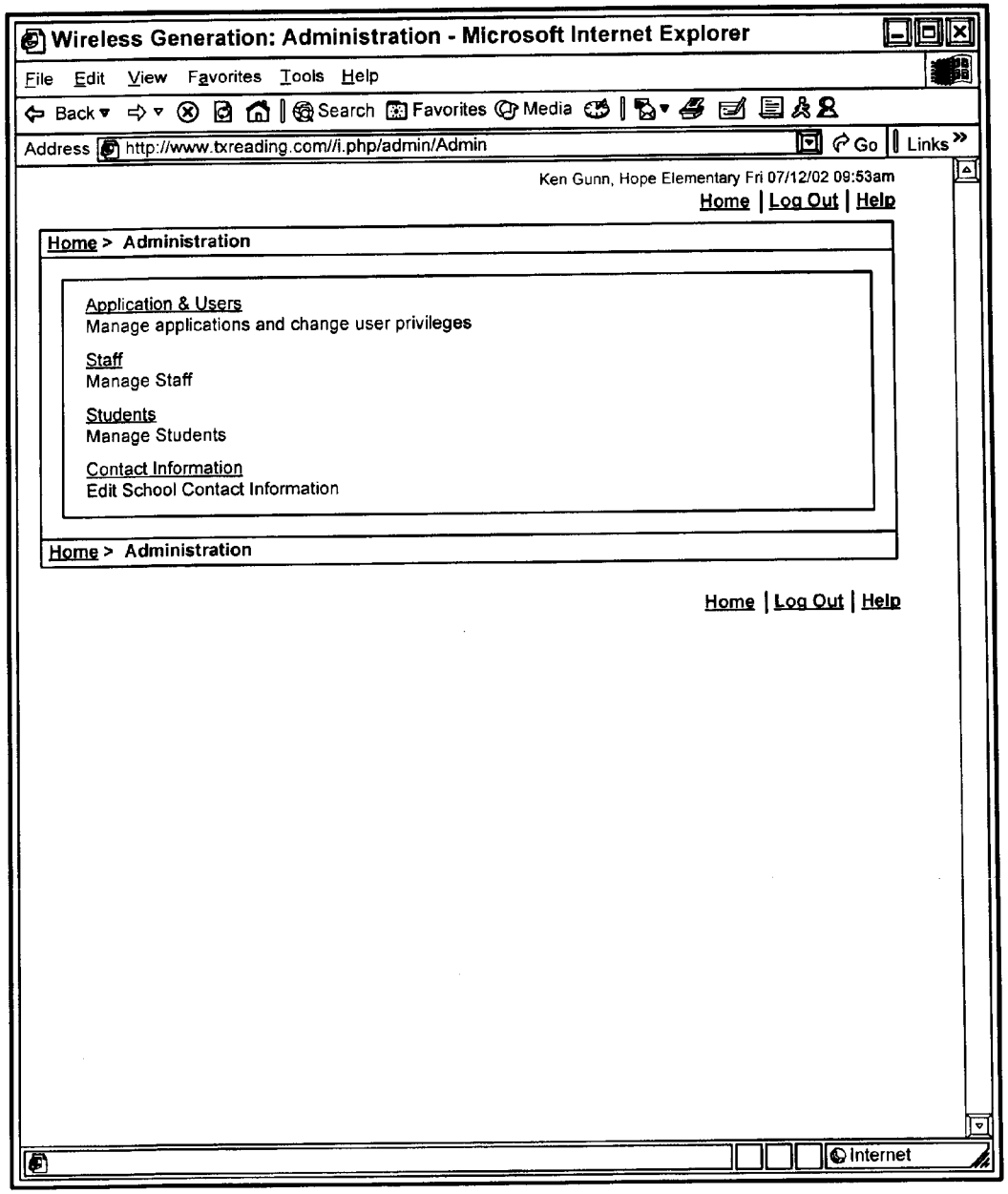
Figure 5E:
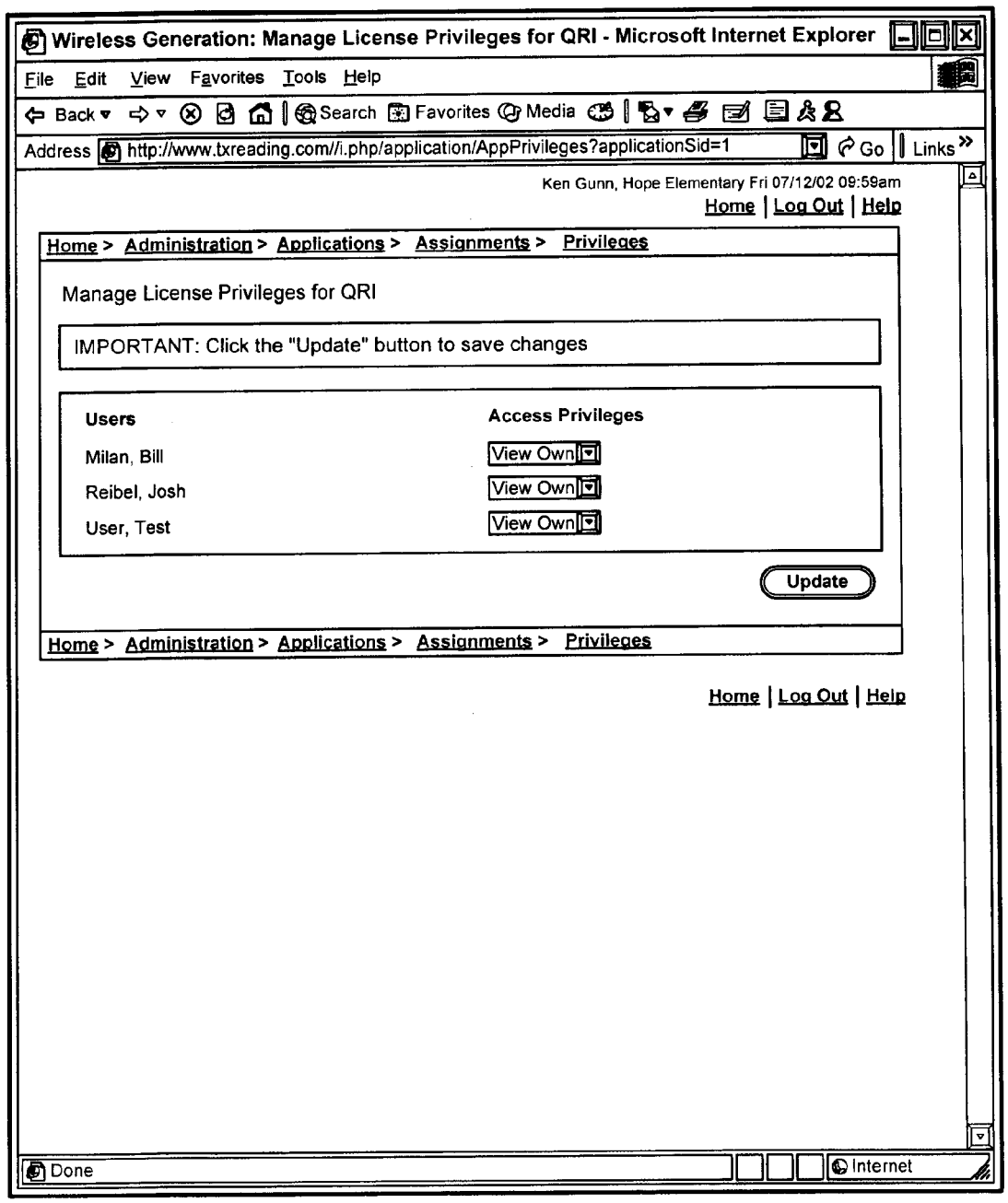
Figure 5F:
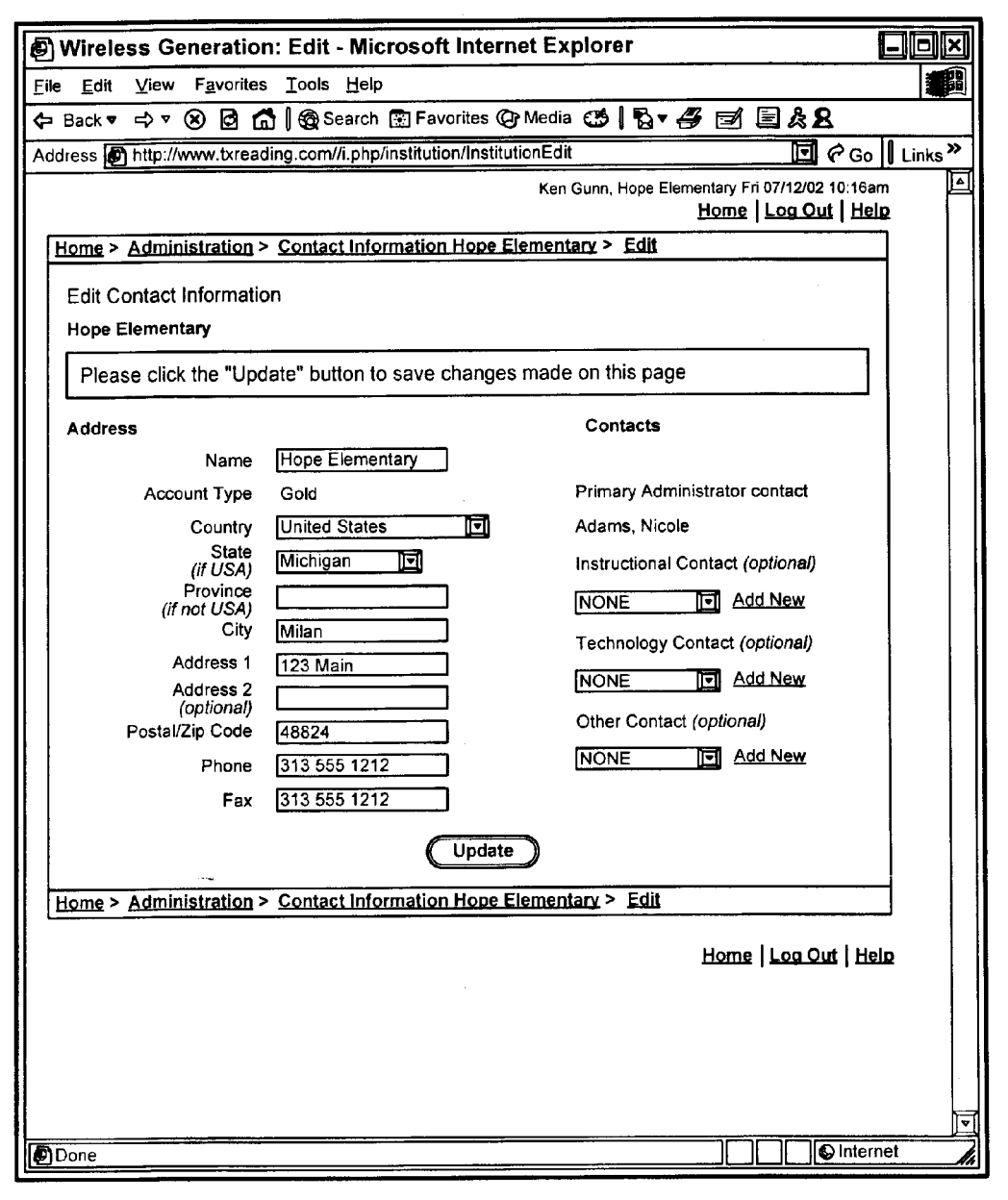
Figure 5H:
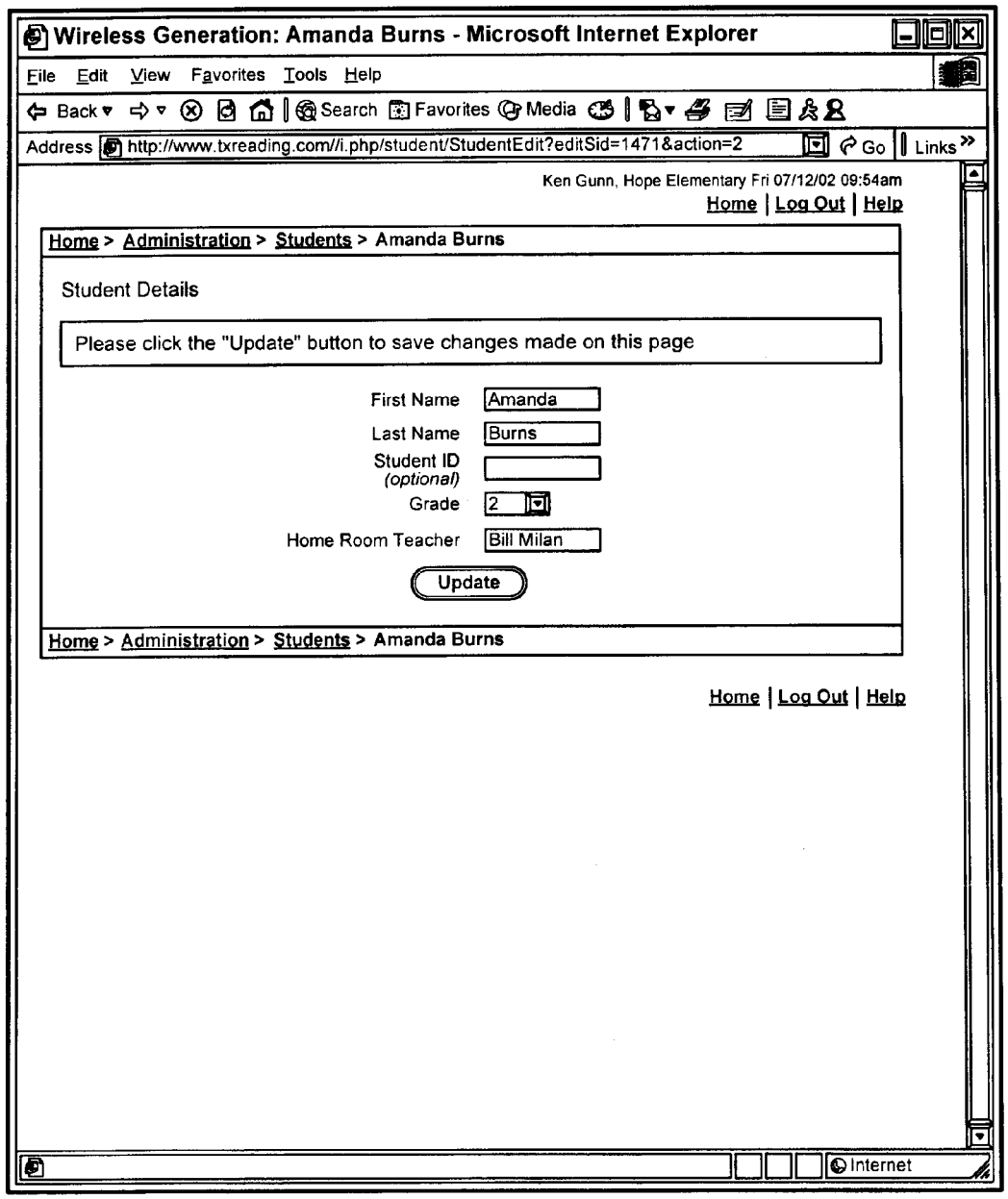
Figure 5I:
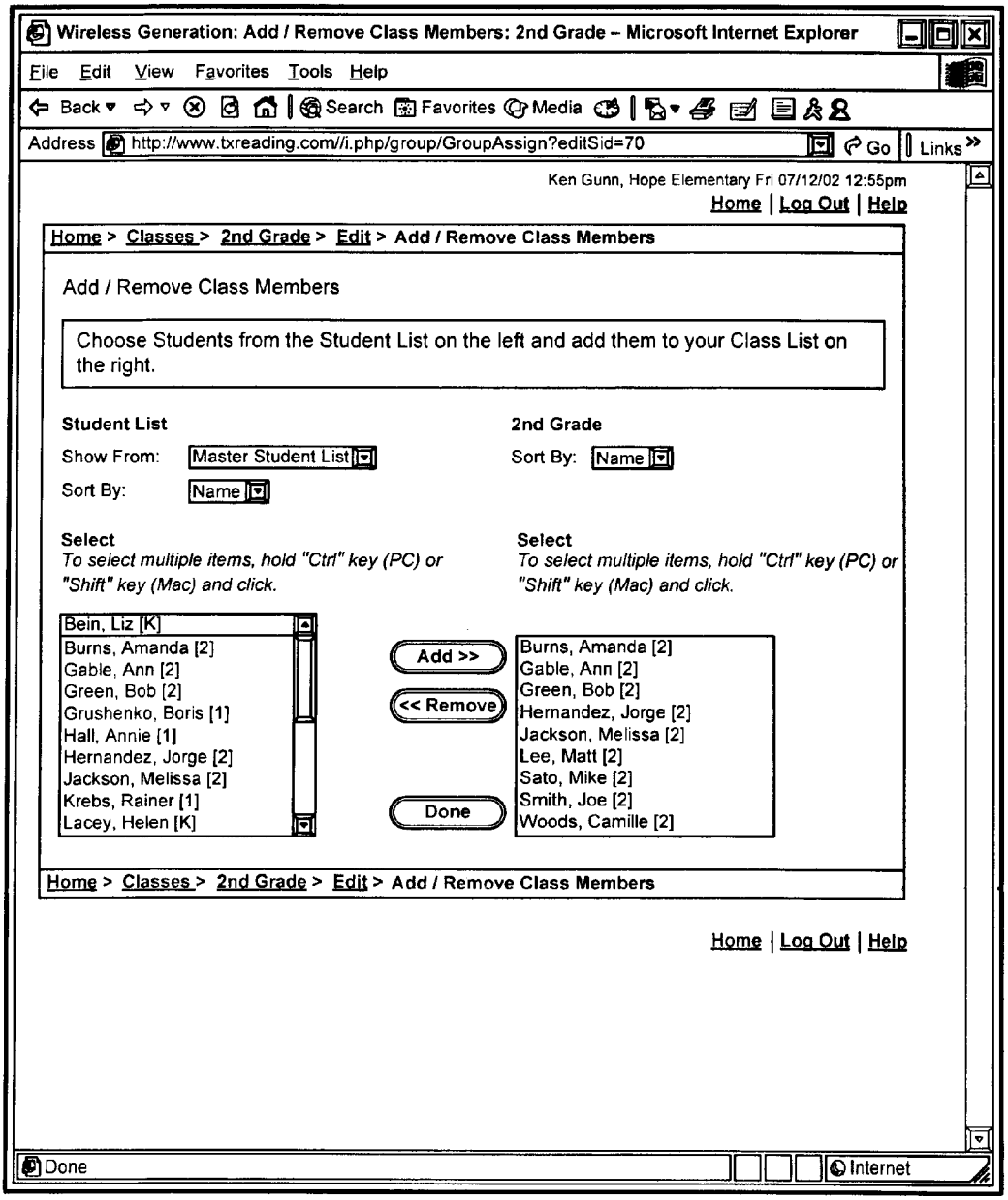
Figure 5J:
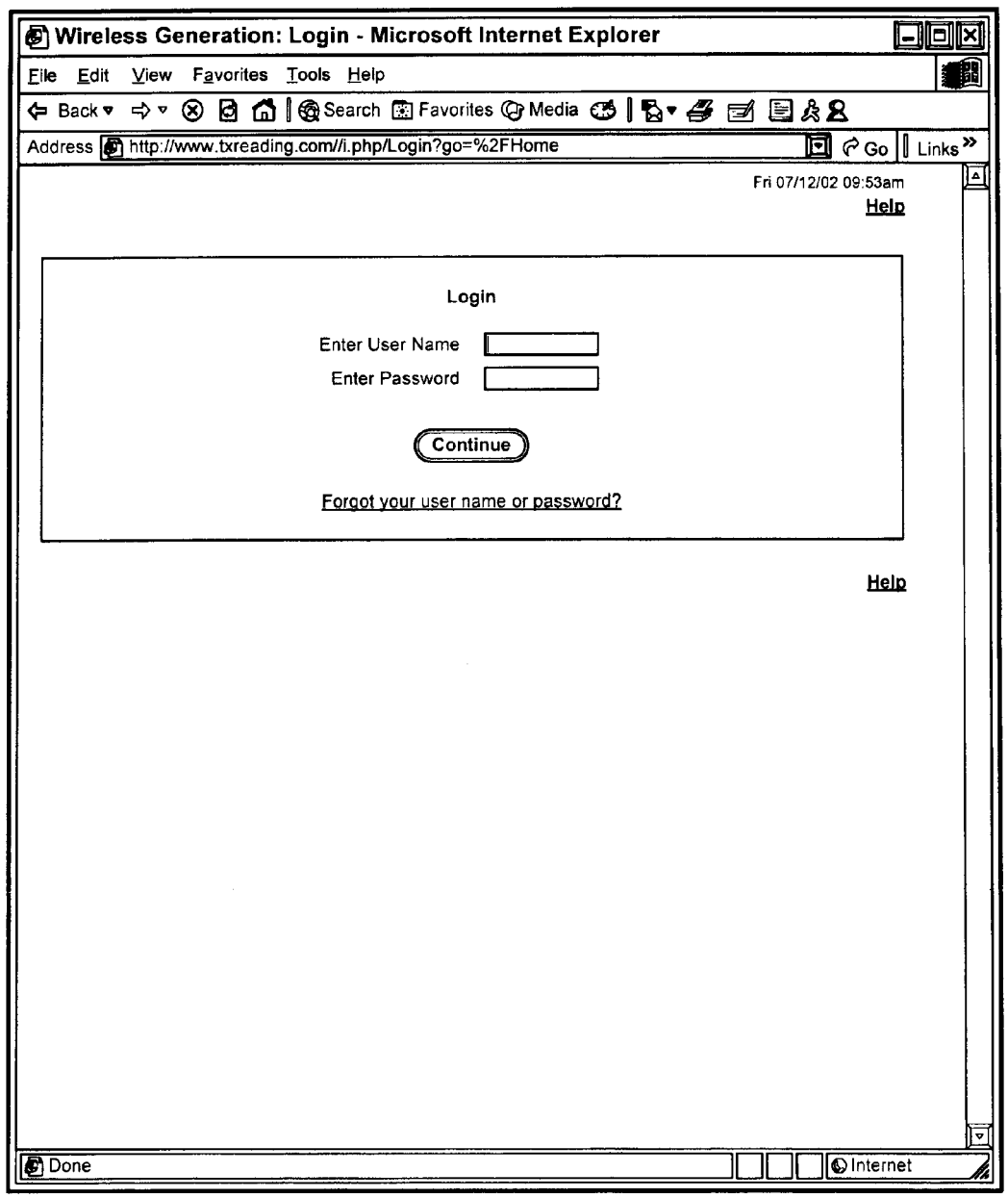
Figure 5K:
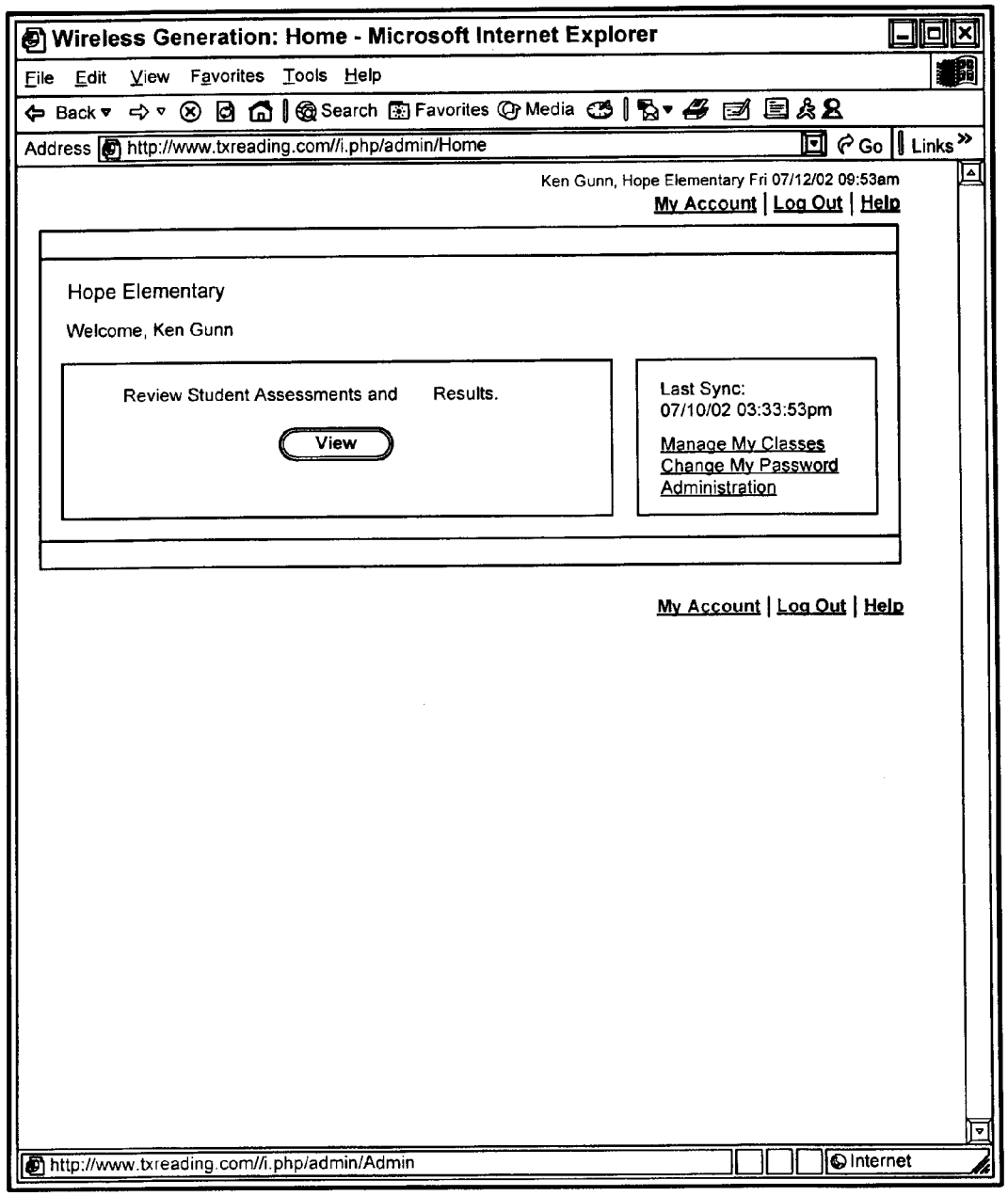

FIGS. 5A–C are three exemplary report window or screen shots 510, 520 and 530, respectively, displayed on workstation 106 during the view report step (i.e., step 226 of process 200).

In report screen 510, the teacher can see a graphical report of a student's assessment. Each error shows up in a diagnostic window 502 which contains the kind of error and any M/S/V analysis that was conducted during the assessment. A statistics area 504 contains important statistics about the student's error types. At the bottom of the screen, teachers can record any notes they wish to associate with the assessment. In an embodiment, an e-mail button 506 is provided which allows the teacher to communicate with students and parents directly.

Screen 510 also includes a progress link 508. Clicking link 508 causes report screen 520 to be displayed. Report screen 520 illustrates a student's progress over time as they have moved through various reading levels. A chart 512 is displayed with each point 514 being a link to a fill report for the previous assessment it represents.

Screen 520 also includes a class summary link 516. Clicking on link 516 causes screen 530 to be displayed. Report screen 530 is a view of the entire class' progress over time. The number of days each student has been on his or her current reading level is displayed in an area 522. In an embodiment, screen 530 will highlight all students who have been on a specific reading level too long (based on the teacher's pre-set requirements). Screen 530 also contains a plurality of graphs (shown as graphs 524*a*–*b*) which can display various comparisons of the class' achievement to that of other classes or categories of students.

VII. Example Implementations

Figure 7:
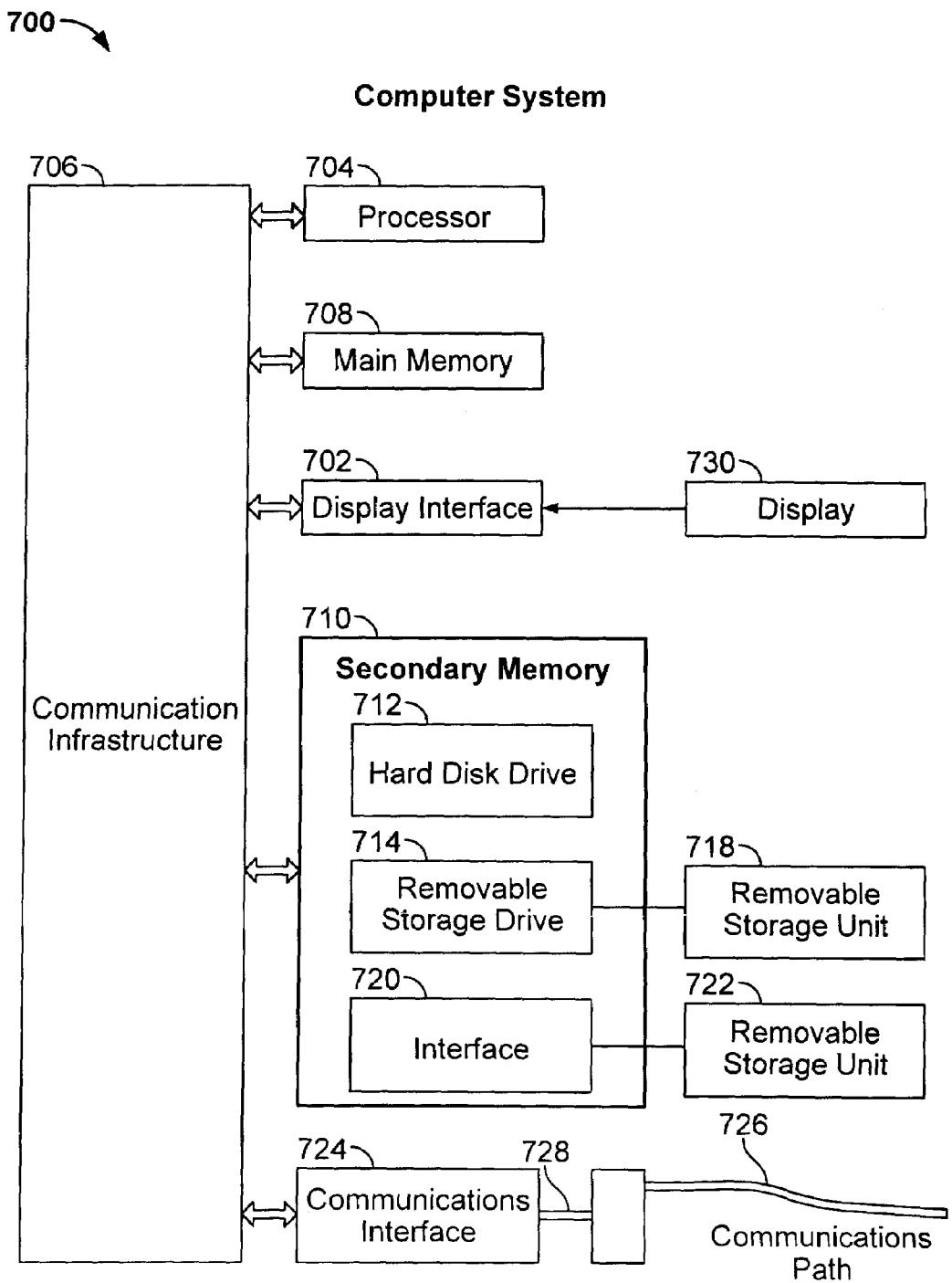
FIG. 7 is a block diagram of an exemplary computer system useful for implementing the present invention.

The present invention (i.e., system 100, process 200, architecture 300 and/or any part(s) or function(s) thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 700 is shown in FIG. 7.

Computer system 700 includes one or more processors, such as processor 704. The processor 704 is connected to a communication infrastructure 706 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 700 can include a display interface 702 that forwards graphics, text, and other data from the communication infrastructure 706 (or from a frame buffer not shown) for display on the display unit 730.

Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728 which may be electronic, electromagnetic, optical or other signals capable of being received by communications interface 724. These signals 728 are provided to communications interface 724 via a communications path (e.g., channel) 726. This channel 726 carries signals 728 and maybe implemented using wire or cable, fiber optics, a telephone line, a cellular link, an radio frequency (RF) link and other communications channels.

In this document, the terms "computer program medium" and "computer usable medium" are used to generally refer to media such as removable storage drive 714, a hard disk installed in hard drive 712, and signals 728. These computer program products provide software to computer system 700. The invention is directed to such computer program products.

Computer programs (also referred to as computer control logic) are stored in main memory 708 and/or secondary memory 710. Computer programs may also be received via communications interface 724. Such computer programs, when executed, enable the computer system 700 to perform the features of the present invention, as discussed herein. In particular, the computer programs, when executed, enable the processor 704 to perform the features of the present invention. Accordingly, such computer programs represent controllers of the computer system 700.

In an embodiment where the invention is implemented using software, the software may be stored in a computer program product and loaded into computer system 700 using removable storage drive 714, hard drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VIII. Conclusion

It should be understood that FIGS. 4 and 5, which highlight the functionality and other advantages of RTOA system 100, are presented for example purposes only. The architecture of the present invention is sufficiently flexible and configurable such that users may utilize system 100 in ways other than that shown in FIGS. 4 and 5 (e.g., the use of different button labels, screen annotation characters, button codes for different behaviors of interests, report formats and the like).

While various embodiments of the present invention have been described above, it should be understood that they have been presented by way of example and not limitation. It will be apparent to persons skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method for providing a teacher with a substantialy real-time, literacy observation application for execution on a mobile computing device in order to assess a student, the method comprising:

storing content that is made perceivable to an assessed student on a mobile computing device;

providing a ticker area on a first screen displayed on the mobile computing device, wherein at least a portion of the content that is made perceivable to the assessed student is displayed in the ticker area;

providing a first palette on the first screen;

providing a plurality of buttons on the first palette on the first screen, wherein each of the plurality of buttons corresponds to at least one of a plurality of behaviors observable by a teacher during an assessment and related to the content that is made perceivable to the assessed student;

providing a freehand area on the first screen, wherein the teacher may create a note relating to one of the plurality of observable behaviors;

and displaying a word in the ticker area and an annotation corresponding to one of the plurality of observable behaviors in response to the teacher interacting with one of the plurality of buttons on the first palette.

2. The method of claim 1, wherein said plurality of buttons on the first palette includes buttons corresponding to at least one of the following observable behaviors: (i) Omission; (ii) Told; (iii) Substitution; (iv) Insertion; and (v) Self-Correction.

3. The method of claim 1, further comprising:

providing a plurality of buttons on a second palette on the first screen, wherein each of the plurality of buttons corresponds to a pre-defined cue which the teacher may observe daring the assessment.

4. The method of claim 3, wherein the plurality of buttons on the second palette includes buttons corresponding to at least one of the following pre-defined cues: (i) Meaning; (ii) Syntax; and (iii) Visual.

5. The method of claim 1, further comprising:

providing a plurality of buttons on a second screen, wherein each of the plurality of buttons corresponds to a pre-defined cue which the teacher may observe daring the assessment.

6. The method of claim 5, wherein the plurality of buttons on the second screen includes buttons corresponding to at least one of the following pre-defined cues: (i) Meaning; (ii) Syntax; and (iii) Visual.

7. The method of claim 1, further comprising:

displaying a second screen on the mobile computing device including an accuracy rate achieved by the student during the assessment.

8. The method of claim 1, further comprising:

displaying a second screen on the mobile computing device including a ratio of self-corrections to errors achieved by the student during the assessment.

9. The method of claim 1 wherein storing content that is made perceivable to an assessed student comprises storing text of at least one book.

10. The method of claim 9 wherein content that is made perceivable to an assessed student comprises storing all of the text of the at least one book.

11. The method of claim 1 wherein the teacher may create, after interacting with one of the plurality of buttons on the first palette, a note relating to the corresponding one of the plurality of observable behaviors.

12. The method of claim 1 wherein the teacher, after interacting with one of the plurality of buttons on the first palette, may create a note relating to the corresponding one of the plurality of observable behaviors.

13. The method of claim 1 whereby the teacher has access, substantially in real-time relative to the completion of the assessment, to statistics reflecting the results of the assessment on the mobile computing device.

14. The method of claim 11, further comprising:

causing, after being selected by the teacher in the ticker area, a word from the content to be displayed in a lens area on the first screen, and allowing the creation of the note relating to the word and the one of the plurality of observable behaviors in the freehand area.

15. A computer program product comprising a computer usable medium having control logic stored therein for providing a teacher with a real-time, literacy observation application for execution on a mobile computing device in order to assess a student, the control logic, when executed, causes the mobile computing device to:

store content that is made perceivable to an assessed student on a mobile computing device;

provide a ticker area on a first screen displayed on the mobile computing device, wherein at least a portion of the content tat is made perceivable to the assessed student is displayed in the ticker area;

provide a first palette on the first screen;

provide a plurality of buttons on the first palette on the first screen, wherein each of the plurality of buttons corresponds to at least one of a plurality of behaviors observable by a teacher during an assessment;

provide a freehand area on the first screen, wherein the teacher may create a note relating to the corresponding one of the plurality of observable behaviors; and displaying a word in the ticker area and an annotation corresponding to one of the plurality of observable behaviors in response to the teacher interacting with one of the plurality of buttons on the first palette.

16. The computer program product of claim 15 wherein the control logic, when executed, is further configured to cause the mobile computing device to:

display, after being tapped by the teacher in said ticker area, a word from the text of the book to be displayed in a lens area on the first screen, and allow the creation of said note relating to the word and said one of the plurality of observable behaviors in said freehand area.

17. The computer program product of claim 15, wherein the plurality of buttons on said first palette includes buttons corresponding to at least one of the following observable behaviors: (i) Omission; (ii) Told; (iii) Substitution; (iv) Insertion; and (v) Self-Correction.

18. The computer program product of claim 15 wherein the control logic, when executed, is further configured to cause the mobile computing device to:

provide a plurality of buttons on a second palette on the first screen, wherein each of the plurality of buttons corresponds to a pre-defined cue which the teacher may observe during the assessment.

19. The computer program product of claim 18, wherein the plurality of buttons on the second palette includes buttons corresponding to at least one of the following pre-defined cues: (i) Meaning; (ii) Syntax; and (iii) Visual.

20. The computer program product of claim 15 wherein the control logic, when executed, is further configured to cause the mobile computing device to:

provide a plurality of buttons on a second screen, wherein each of the plurality of buttons corresponds to a pre-defined cue which the teacher may observe during the assessment.

21. The computer program product of claim 20, wherein said plurality of buttons on the second screen includes buttons corresponding to at least one of the following pre-defined cues: (i) Meaning; (ii) Syntax; and (iii) Visual.

22. The computer program product of claim 15 wherein the control logic, when executed, is further configured to cause the mobile computing device to:

display a second screen on the mobile computing device including an accuracy rate achieved by the student during the assessment.

23. The computer program product of claim 15 wherein the control logic, when executed, is further configured to cause the mobile computing device to:
display a second screen on the mobile computing device containing a ratio of self-corrections to errors achieved by the student during the assessment.

24. The computer program product of claim 15 wherein storing content that is made perceivable to an assessed student comprises storing text of at least one book.

25. The computer program product of claim 15 wherein storing content that is made perceivable to an assessed student comprises storing all of the text of the at least one book.

26. The computer program product of claim 15 wherein the teacher may create, after interacting with one of the plurality of buttons on the first palette, a note relating to the corresponding one of the plurality of behaviors of interest.

27. The computer program product of claim 15 wherein the control logic is further configured to enable the teacher to, after interacting with one of the plurality of buttons on the first palette, create a note relating to the corresponding one of the plurality of behaviors of interest.

28. The computer program product of claim 15 wherein the control logic is further configured to enable the teacher obtain access, substantially in real-time relative to the completion of the assessment, to statistics reflecting the results of the assessment on the mobile computing device.

29. A method for assessing literacy, the method comprising:
providing multiple behavior indicators on a mobile computing device, each behavior indicator representing a particular behavior observable by a teacher during a literacy assessment;
providing a freehand area on the mobile computing device to enable the teacher to enter a note related to a behavior observed during the literacy assessment;
displaying content on the mobile computing device, the content corresponding to content being presented to a person who is a subject of a literacy assessment;
receiving, from the teacher using the mobile computing device, an indication that corresponds to one of the provided multiple behavior indicators and represents a behavior that is observed by the teacher during the literacy assessment relative to the content presented to the person being assessed;
receiving, from the teacher using the mobile computing device, a note entered through the provided freehand area, the note being related to the behavior observed by the teacher during the literacy assessment relative to the content presented to the person being assessed; and
displaying a word of the content being presented to the person being assessed and an annotation related to the behavior observed by the teacher.

30. The method of claim 29 wherein the content presented to the person being assessed comprises a portion of a book.

31. The method of claim 29 wherein the note entered through the provided freehand area is received after the receipt of the indication that corresponds to one of the provided multiple behavior indicators.

32. The method of claim 29 further comprising providing, substantially in real-time relative to the completion of the literacy assessment, the teacher with statistics on the mobile computing device reflecting results of the literacy assessment.

33. The method of claim 32 wherein the statistics are provided to the teacher substantially in real-time with respect to completion of the literacy assessment.

34. The method of claim 29 further comprising associating the note with a particular portion of the content made perceivable to an assessed student.

35. The method of claim 29 wherein an observed behavior is at least one of omission, told, substitution, insertion, and self-correction.

36. The method of claim 29 further comprising:
providing an indicator of multiple pre-defined cues, each pre-defined cue being observable by the teacher during a literacy assessment; and
receiving, from the teacher using the mobile computing device, an indication that corresponds to one of the pre-defined cues and is observed by the teacher during the literacy assessment relative to the presentation of the content being assessed.

37. The method of claim 36 wherein a pre-defined cue is at least one of meaning, syntax, and visual.

38. The method of claim 29 wherein a button on the mobile computing device corresponds to at least one of the multiple behavior indicators.

39. The method of claim 29 wherein the content comprises all substantive content presented to the person as a basis for soliciting feedback from the person and thereafter making the literacy assessment of the person.

* * * * *